US012794591B2

(12) United States Patent
Zhao et al.

(10) Patent No.: US 12,794,591 B2
(45) Date of Patent: Nov. 10, 2026

(54) COMMUNICATION METHOD AND APPARATUS

(71) Applicant: HUAWEI TECHNOLOGIES CO., LTD., Shenzhen (CN)

(72) Inventors: Feiran Zhao, Hangzhou (CN); Ying Chen, Hangzhou (CN); Yinggang Du, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 280 days.

(21) Appl. No.: 18/620,673

(22) Filed: Mar. 28, 2024

(65) Prior Publication Data

US 2024/0243848 A1 Jul. 18, 2024

Related U.S. Application Data

(63) Continuation of application No. PCT/CN2022/120914, filed on Sep. 23, 2022.

(30) Foreign Application Priority Data

Sep. 30, 2021 (CN) .......................... 202111166218.0

(51) Int. Cl.
*H04L 1/08* (2006.01)
*H04B 7/185* (2006.01)

(52) U.S. Cl.
CPC ........... *H04L 1/08* (2013.01); *H04B 7/18513* (2013.01)

(58) Field of Classification Search
None
See application file for complete search history.

(56) References Cited

U.S. PATENT DOCUMENTS

2022/0311582 A1* 9/2022 Ye .......................... H04W 76/14
2022/0353660 A1* 11/2022 Ye .......................... H04W 24/08
2023/0171777 A1* 6/2023 Yuan .................. H04B 7/06952 370/329

FOREIGN PATENT DOCUMENTS

WO 2021162613 A1 8/2021

OTHER PUBLICATIONS

Huawei et al., "Discussion on time and frequency synchronization enhancement for IoT in NTN," 3GPP TSG RAN WG1 Meeting #106bis-e, R1-2108750, e-Meeting, Oct. 11-19, 2021, 10 pages.
3GPP TS 36.211 V16.7.0, "3rd Generation Partnership Project; Technical Specification Group Radio Access Network; Evolved Universal Terrestrial Radio Access (E-UTRA); Physical channels and modulation (Release 16)," Sep. 2021, 249 pages.

(Continued)

*Primary Examiner* — Angela Nguyen
(74) *Attorney, Agent, or Firm* — Fish & Richardson P.C.

(57) ABSTRACT

Embodiments of this application relate to communication methods and apparatuses. An example method may include: receiving indication information, where the indication information indicates a first repetition segment duration; and sending, a first message based on the first repetition segment duration. Another example method may include: determining a first repetition segment duration, where the first repetition segment duration is used to transmit a first message; and sending indication information, where the indication information indicates the first repetition segment duration.

20 Claims, 4 Drawing Sheets

(56) References Cited

OTHER PUBLICATIONS

International Search Report and Written Opinion in International Appln. No. PCT/CN2022/120914, mailed on Nov. 28, 2022, 15 pages (with English translation).
Extended European Search Report in European Appln. No. 22874793.7, mailed on Dec. 16, 2024, 9 pages.
Huawei et al., "Discussion on time and frequency synchronization enhancement for IoT in NTN," 3GPP TSG RAN WG 1 Meeting #106-e, R1-2106485, E-Meeting, Aug. 16-27, 2021, 6 pages.
Extended European Search Report in European Appln. No. 26159541.7, mailed on Jun. 16, 2026, 10 pages.

* cited by examiner

COMMUNICATION METHOD AND APPARATUS

CROSS-REFERENCE TO RELATED APPLICATIONS

This application is a continuation of International Application No. PCT/CN2022/120914, filed on Sep. 23, 2022, which claims priority to Chinese Patent Application No. 202111166218.0, filed on Sep. 30, 2021. The disclosures of the aforementioned applications are hereby incorporated by reference in their entireties.

TECHNICAL FIELD

Embodiments of this application relate to the communication field, and in particular, to a communication method and apparatus.

BACKGROUND

In a non-terrestrial network (NTN) technology, typical communication devices such as satellites and high-altitude platforms (HPAs) are used in network deployment, so that global network coverage can be implemented. An NTN is integrated with a terrestrial communication network to constitute a sea-land-air-space integrated communication network with seamless global coverage. In the NTN, a low earth orbit (LEO) satellite system has a low round-trip delay (RTD) and a low path loss, and can be applied to an internet of things (IOT) system.

A weak transmit power level of a terminal in the IoT system and restrictions imposed by hardware factors such as a transmit antenna of the terminal result in a low signal-to-noise ratio of an IoT uplink transmission. Therefore, to improve preamble sequence detection performance and a receive signal-to-noise ratio for sending uplink data and a preamble sequence of a system, the IoT terminal needs to reuse a specific number of repetitions for transport blocks during uplink sending. Currently, a maximum allowed time-continuous transmission duration of an uplink data or preamble transmission is specified in a long term evolution (LTE) standard. Due to mobility of a network device in an NTN system, an accumulated timing advance (TA) error of the NTN system within the maximum allowed time-continuous transmission duration may cause out-of-synchronized communication, affecting communication.

In this case, a design of a new repeated transmission mechanism that ensures information synchronization of an NTN communication device and improves communication efficiency is an urgent problem to be resolved.

SUMMARY

Embodiments of this application provide a communication method and apparatus, to avoid out-of-synchronized communication due to an excessively large accumulated TA error caused by a communication device, so that communication efficiency is improved.

According to a first aspect, a communication method is provided. The method may include: A first communication apparatus receives indication information, where the indication information indicates a first repetition segment duration, the first repetition segment duration is determined based on a first mapping relationship and a current beam elevation angle of a terminal device, and the first mapping relationship includes a correspondence between a beam elevation angle and repetition segment durations; and the first communication apparatus determines the first repetition segment duration based on the indication information and the first mapping relationship.

The first communication apparatus may be the terminal device. According to the method, the repetition segment duration of a current information transmission is determined based on the beam elevation angle of the terminal device. When a location of a network device changes, an appropriate repetition segment duration can be provided, to implement communication synchronization between the terminal device and the network device.

It may be understood that the indication information may be an index, and is used by the terminal device to search the first mapping relationship for a repetition segment duration corresponding to the index. Alternatively, the indication information may directly indicate the repetition segment duration, that is, may be a specific duration value. This is not limited in this application.

With reference to the first aspect, in some implementations of the first aspect, the first communication apparatus sends a first message based on the first repetition segment duration.

It may be understood that the first message is sent by the terminal device to the network device. The first message may include uplink data or an uplink preamble. For example, the first message includes a narrowband physical uplink shared channel (NPUSCH), or may include a narrowband physical random access channel (NPRACH).

With reference to the first aspect, in some implementations of the first aspect, the first mapping relationship is determined from a plurality of mapping relationships, each of the plurality of mapping relationships corresponds to at least one communication parameter, each mapping relationship includes the correspondence between the beam elevation angle and the repetition segment durations, the first mapping relationship is a mapping relationship corresponding to a first parameter, and the first parameter is a communication parameter currently used by the terminal device.

In other words, the repetition segment duration is related to the beam elevation angle of the terminal device, and may also be related to the communication parameter of the terminal device for the current information transmission.

With reference to the first aspect, in some implementations of the first aspect, the communication parameter includes a message format and/or a numerology.

In this solution, a mapping relationship between a communication parameter, a beam elevation angle, and a repetition segment duration is comprehensively considered, and different repetition segment durations for different communication parameters can be determined. This further improves reasonableness of a repetition segment duration of an information transmission.

It may be understood that the communication parameter may be scheduled when the network device configures a resource for a current data transmission before the current information transmission, or may be reported by the terminal device before the information transmission. This is not limited in embodiments of this application.

With reference to the first aspect, in some implementations of the first aspect, in the first mapping relationship, absolute values of differences between any two adjacent beam elevation angles in beam elevation angles are the same, or absolute values of differences between any two adjacent repetition segment durations in repetition segment durations are the same.

Herein, "adjacent" may mean that adjacent beam elevation angles (or repetition segment durations) in beam elevation angles (or repetition segment durations) arranged in ascending or descending order.

In this solution, equal differential division is performed on the beam elevation angles or the repetition segment durations, and a corresponding repetition segment duration is determined based on an interval of equidistant beam elevation angles or an interval of equidistant repetition segment durations. This can further reduce indication signaling. According to a solution in which the mapping relationship between the repetition segment durations and the beam elevation angles is determined through equal repetition-segment-duration division, appropriate repetition segment durations for different beam elevation angles can be determined based on change rates of the repetition segment durations. This further improves communication efficiency.

With reference to the first aspect, in some implementations of the first aspect, in the first mapping relationship, each of the repetition segment durations includes at least one repetition unit.

With reference to the first aspect, in some implementations of the first aspect, in the first mapping relationship, absolute values of differences between numbers of any two adjacent repetition units in a number of the at least one repetition unit are the same.

To be specific, the repetition segment duration may include a plurality of repetition units; or numbers of repetition units for different beam elevation angles may be determined through equal division of numbers of repetition units. This solution is applicable to a NPRACH transmission scenario.

With reference to the first aspect, in some implementations of the first aspect, before the first communication apparatus receives the indication information, the first communication apparatus sends first information, where the first information includes location information, and the location information is used to determine the current beam elevation angle of the terminal device.

That is, the terminal device may report the location information of the terminal device to the network device. It may be understood that the terminal device may periodically report the location information to the network device. Optionally, the network device may determine the location information of the terminal device based on an ephemeris, to determine the beam elevation angle of the terminal device. This is not limited in embodiments of this application.

With reference to the first aspect, in some implementations of the first aspect, at least one of the repetition segment durations is less than or equal to a maximum allowed time-continuous transmission duration corresponding to the at least one repetition segment duration.

The maximum allowed time-continuous transmission duration may be determined based on a timing error (Te) and a timing advance rate ($TA_{rate}$).

According to a second aspect, a communication method is provided. The method may include: A second communication apparatus determines a first repetition segment duration based on a first mapping relationship, where the first mapping relationship includes a correspondence between a beam elevation angle and repetition segment durations, the first repetition segment duration is a repetition segment duration corresponding to a first beam elevation angle, and the first beam elevation angle is a current beam elevation angle of a terminal device; and the second communication apparatus sends indication information, where the indication information indicates the first repetition segment duration.

The second communication apparatus may be a network device.

With reference to the second aspect, in some implementations of the second aspect, the second communication apparatus receives a first message based on the first repetition segment duration.

With reference to the second aspect, in some implementations of the second aspect, the first mapping relationship is determined from a plurality of mapping relationships, each of the plurality of mapping relationships corresponds to at least one communication parameter, each mapping relationship includes the correspondence between the beam elevation angle and the repetition segment durations, the first mapping relationship is a mapping relationship corresponding to a first parameter, and the first parameter is a communication parameter currently used by the terminal device.

With reference to the second aspect, in some implementations of the second aspect, the communication parameter includes a message format and/or a numerology.

With reference to the second aspect, in some implementations of the second aspect, in the first mapping relationship, absolute values of differences between any two adjacent beam elevation angles in beam elevation angles are the same, or absolute values of differences between any two adjacent repetition segment durations in repetition segment durations are the same.

With reference to the second aspect, in some implementations of the second aspect, in the first mapping relationship, each of the repetition segment durations includes at least one repetition unit.

With reference to the second aspect, in some implementations of the second aspect, in the first mapping relationship, absolute values of differences between numbers of any two adjacent repetition units in a number of the at least one repetition unit are the same.

With reference to the second aspect, in some implementations of the second aspect, at least one of the repetition segment durations is less than or equal to a maximum allowed time-continuous transmission duration corresponding to the at least one repetition segment duration.

The maximum allowed time-continuous transmission duration may be determined based on a timing error (timing error, Te) and a timing advance rate ($TA_{rate}$).

It should be understood that the method in the second aspect is the method that is performed by a network side and that corresponds to the method in the first aspect, and descriptions of explanations, supplements, and beneficial effects in the first aspect are applicable to the second aspect. Details are not described herein again.

According to a third aspect, a communication apparatus is provided. The communication apparatus may be used as the first communication apparatus according to the first aspect. The communication apparatus may be a terminal device, or may be an apparatus (for example, a chip, a chip system, or a circuit) in a terminal device, or may be an apparatus that can be used together with a terminal device. In a possible implementation, the communication apparatus may include modules or units that are in one-to-one correspondence with the methods/operations/steps/actions described in the first aspect. The modules or units may be implemented by a hardware circuit, software, or a combination of a hardware circuit and software.

In a possible implementation, the communication apparatus may include a transceiver unit and a processing unit. The transceiver unit is configured to receive indication information, where the indication information indicates a first repetition segment duration, the first repetition segment duration is determined based on a first mapping relationship and a current beam elevation angle of the terminal device, and the first mapping relationship includes a correspondence between a beam elevation angle and repetition segment durations. The processing unit is configured to determine the first repetition segment duration based on the indication information and the first mapping relationship.

With reference to the third aspect, in some implementations of the third aspect, the transceiver unit is further configured to send a first message based on the first repetition segment duration.

With reference to the third aspect, in some implementations of the third aspect, the first mapping relationship is determined from a plurality of mapping relationships, each of the plurality of mapping relationships corresponds to at least one communication parameter, each mapping relationship includes the correspondence between the beam elevation angle and the repetition segment durations, the first mapping relationship is a mapping relationship corresponding to a first parameter, and the first parameter is a communication parameter currently used by the terminal device.

With reference to the third aspect, in some implementations of the third aspect, the communication parameter includes a message format and/or a numerology.

With reference to the third aspect, in some implementations of the third aspect, in the first mapping relationship, absolute values of differences between any two adjacent beam elevation angles in beam elevation angles are the same, or absolute values of differences between any two adjacent repetition segment durations in repetition segment durations are the same (equal differential division).

With reference to the third aspect, in some implementations of the third aspect, in the first mapping relationship, each of the repetition segment durations includes at least one repetition unit.

With reference to the third aspect, in some implementations of the third aspect, in the first mapping relationship, absolute values of differences between numbers of any two adjacent repetition units in a number of the at least one repetition unit are the same.

With reference to the third aspect, in some implementations of the third aspect, before the transceiver unit receives the indication information, the transceiver unit is further configured to send first information, where the first information includes location information, and the first location information is used to determine the current beam elevation angle of the terminal device.

With reference to the third aspect, in some implementations of the third aspect, at least one of the repetition segment durations is less than or equal to a maximum allowed time-continuous transmission duration corresponding to the at least one repetition segment duration.

The maximum allowed time-continuous transmission duration may be determined based on a timing error (timing error, Te) and a timing advance rate ($TA_{rate}$).

According to a fourth aspect, a communication apparatus is provided. The communication apparatus may be configured to perform the method according to the second aspect. The communication apparatus may be a network device, or may be an apparatus (for example, a chip, a chip system, or a circuit) in a network device, or may be an apparatus that can be used together with a network device. In a possible implementation, the communication apparatus may include modules or units that are in one-to-one correspondence with the methods/operations/steps/actions described in the second aspect. The modules or units may be implemented by a hardware circuit, software, or a combination of a hardware circuit and software.

In a possible implementation, the communication apparatus may include a transceiver unit and a processing unit. The processing unit may be configured to determine a first repetition segment duration based on a first mapping relationship, where the first mapping relationship includes a correspondence between a beam elevation angle and repetition segment durations, the first repetition segment duration is a repetition segment duration corresponding to a first beam elevation angle, and the first beam elevation angle is a current beam elevation angle of a terminal device. The transceiver unit may be configured to send indication information, where the indication information indicates the first repetition segment duration.

With reference to the fourth aspect, in some implementations of the fourth aspect, the transceiver unit is further configured to receive a first message based on the first repetition segment duration.

With reference to the fourth aspect, in some implementations of the fourth aspect, the first mapping relationship is determined from a plurality of mapping relationships, each of the plurality of mapping relationships corresponds to at least one communication parameter, each mapping relationship includes the correspondence between the beam elevation angle and the repetition segment durations, the first mapping relationship is a mapping relationship corresponding to a first parameter, and the first parameter is a communication parameter currently used by the terminal device.

With reference to the fourth aspect, in some implementations of the fourth aspect, the communication parameter includes a message format and/or a numerology.

With reference to the fourth aspect, in some implementations of the fourth aspect, in the first mapping relationship, absolute values of differences between any two adjacent beam elevation angles in beam elevation angles are the same, or absolute values of differences between any two adjacent repetition segment durations in repetition segment durations are the same.

With reference to the fourth aspect, in some implementations of the fourth aspect, in the first mapping relationship, each of the repetition segment durations includes at least one repetition unit.

With reference to the fourth aspect, in some implementations of the fourth aspect, in the first mapping relationship, absolute values of differences between numbers of any two adjacent repetition units in a number of the at least one repetition unit are the same.

With reference to the fourth aspect, in some implementations of the fourth aspect, before the determining a first repetition segment duration based on a first mapping relationship, the transceiver unit is further configured to obtain first information, where the first information includes location information, and the location information is used to determine the current beam elevation angle of the terminal device.

With reference to the fourth aspect, in some implementations of the fourth aspect, at least one of the repetition segment durations is less than or equal to a maximum allowed time-continuous transmission duration corresponding to the at least one repetition segment duration.

The maximum allowed time-continuous transmission duration may be determined based on a timing error (timing error, Te) and a timing advance rate ($TA_{rate}$).

It should be understood that descriptions of explanations, supplements, and beneficial effects of the first aspect are also applicable to corresponding apparatus sides (the third aspect and the fourth aspect). Details are not described again.

According to a fifth aspect, a computer-readable medium is provided. The computer-readable medium stores program code executed by a communication apparatus, and the program code includes instructions used to perform the communication method in the method according to the first aspect or the second aspect, according to any one of the possible implementations of the first aspect or the second aspect, or according to all possible implementations of the first aspect or the second aspect.

According to a sixth aspect, a computer program product including instructions is provided. When the computer program product runs on a computer, the computer is enabled to perform the method according to the first aspect or the second aspect, according to any one of the possible implementations of the first aspect or the second aspect, or according to all possible implementations of the first aspect or the second aspect.

According to a seventh aspect, a communication system is provided. The communication system includes an apparatus having functions of implementing the method and various possible designs according to the first aspect or the second aspect, according to any one of the possible implementations of the first aspect or the second aspect, or according to all possible implementations of the first aspect or the second aspect.

According to an eighth aspect, a communication apparatus is provided. The communication apparatus includes a processor coupled to a memory. The processor is configured to execute a computer program or instructions that is/are stored in the memory, to perform the method according to the first aspect or the second aspect, according to any one of the possible implementations of the first aspect or the second aspect, or according to all possible implementations of the first aspect or the second aspect.

According to a ninth aspect, a chip is provided. The chip includes a processor and a communication interface. The communication interface is configured to communicate with an external component or an internal component, and the processor is configured to implement the method according to the first aspect or the second aspect, according to any one of the possible implementations of the first aspect or the second aspect, or according to all possible implementations of the first aspect or the second aspect.

Optionally, the chip may further include a memory. The memory stores instructions. The processor is configured to execute the instructions stored in the memory or other instructions. When the instructions are executed, the processor is configured to implement the method according to any one of the first aspect, the second aspect, or the possible implementations of the first aspect or the second aspect.

Optionally, the chip may be integrated into a terminal device or a network device.

DESCRIPTION OF EMBODIMENTS

The technical solutions in embodiments of this application may be applied to an NTN system, for example, an uncrewed aerial vehicle, a satellite communication system, or a high altitude platform station (HAPS) communication system. A satellite communication system is used as an example. The satellite communication system may be integrated into an existing terrestrial mobile communication system, for example, an LTE system, an LTE frequency division duplex (FDD) system, an LTE time division duplex (TDD) system, a 5th generation (5G) system, a new radio (NR) system, a device-to-device (D2D) communication system, a machine-to-machine communication system, an internet of vehicles communication system, a satellite communication system, or a future communication system.

Figure 1:
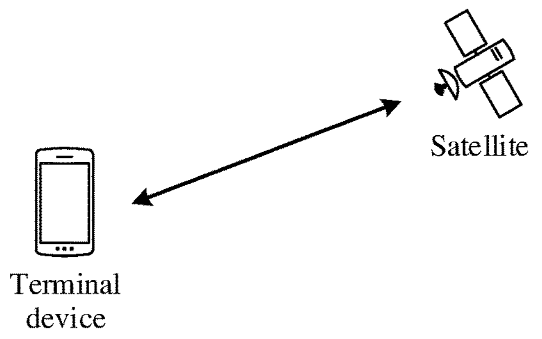
FIG. 1 is a schematic diagram of a communication system applicable to an embodiment of this application.

FIG. 1 is a schematic diagram of an architecture of a communication system to which an embodiment of this application is applicable. As shown in FIG. 1, the communication system may include at least one network device, for example, a network device shown in FIG. 1. The communication system may further include at least one terminal device, for example, a terminal device shown in FIG. 1. The network device may communicate with the terminal device through a radio link.

A satellite described in embodiments of this application may be a satellite base station, or a network side device mounted on the satellite. In this application, the satellite base station, a gateway, or a terrestrial base station is referred to as the network device.

The network device in this application may be an evolved NodeB (evolved NodeB, eNB or eNodeB) in LTE, a base station in a 5G network, a broadband network gateway (BNG), an aggregation switch, a non-3rd generation partnership project (3GPP) access device, or the like. This is not specifically limited in embodiments of this application. Optionally, the base station in embodiments of this application may include base stations in various forms, for example, a macro base station, a micro base station (also referred to as a small cell), a relay station, an access point, a next generation NodeB (gNB), a transmission and reception point (TRP), a transmitting point (TP), a mobile switching center, and a device that functions as a base station in device-to-device (D2D) communication, vehicle-to-everything (V2X) communication, machine-to-machine (M2M) communication, or internet of things (Internet of Things) communication. This is not specifically limited in embodiments of this application.

It should be understood that the network device in embodiments of this application may be a device configured to communicate with the terminal device. The network device is an evolved NodeB (eNB or eNodeB) in an LTE system, or may be one or a group (including a plurality of antenna panels) of antenna panels of a base station in a 5G system, or may be a radio controller in a cloud radio access network (CRAN) scenario. Alternatively, the network device may be a relay station, an access point, a vehicle-mounted device, a wearable device, a terminal that functions as a base station in D2D communication or machine-to-machine communication, a network device in a 5G network, a network device in a future evolved network, or the like. This is not limited in embodiments of this application.

The terminal device described in embodiments of this application may be an internet of things terminal, and may be specifically user equipment (UE), an access terminal, a subscriber unit (subscriber unit), a subscriber station, a mobile station (mobile station), a remote station, a remote terminal, a mobile device, a user terminal (terminal equipment), a wireless communication device, a user agent, or a user apparatus. The terminal device may alternatively be a satellite phone, a cellular phone, a smartphone, a wireless data card, a wireless modem, a machine type communication device, a cordless phone, a session initiation protocol (SIP) phone, a wireless local loop (WLL) station, a personal digital assistant (PDA), a virtual reality (VR) terminal device, an augmented reality (AR) terminal device, a wireless terminal device in industrial control (industrial control), a wireless terminal device in self-driving (self-driving), a wireless terminal device in telemedicine (remote medical), a wireless terminal device in a smart grid (smart grid), a wireless terminal device in transportation safety (transportation safety), a wireless terminal device in a smart city (smart city), a wireless terminal device in a smart home (smart home), a handheld device having a wireless communication function, a computing device, another processing device connected to a wireless modem, a vehicle-mounted device, a communication device mounted on a high-altitude aircraft, a wearable device, a terminal device in a 5G network or a future communication network, or the like. This is not limited in this application.

Figure 2:
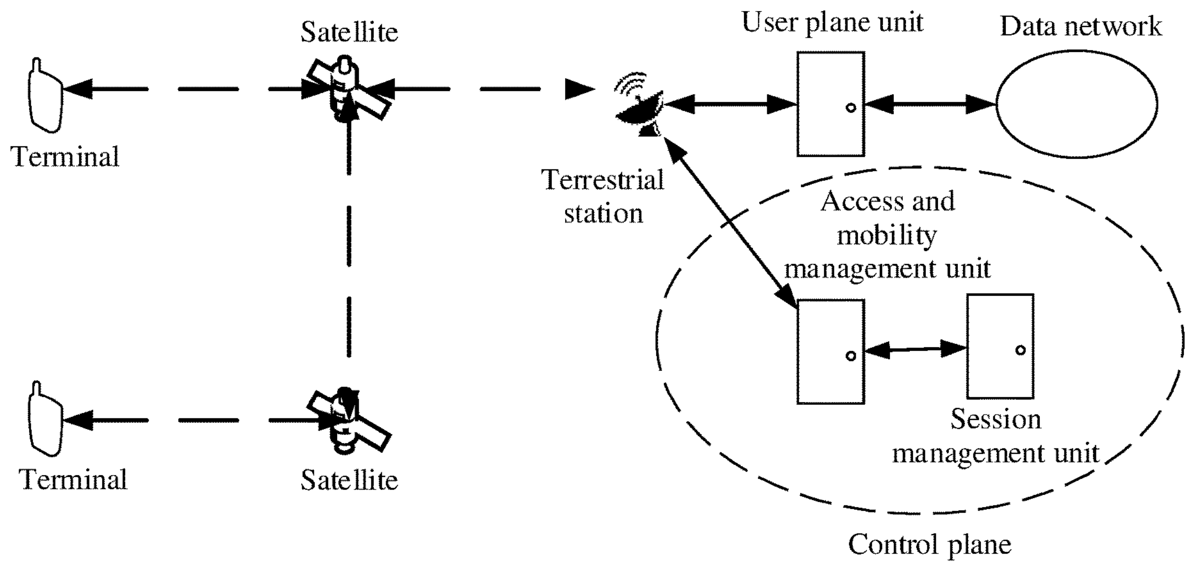
FIG. 2 is a schematic diagram of a satellite communication system applicable to an embodiment of this application.

The solutions provided in this application may be applied to a satellite communication scope. For example, 3GPP members integrate satellite communication and a 5G technology. FIG. 2 shows a network application architecture of the technology. A terrestrial mobile terminal accesses a network. A network device, for example, a gNB, is deployed on a satellite, and is connected to a terrestrial core network through a radio link. In addition, a radio link exists between satellites, to complete signaling interaction and user data transmission between base stations. Network elements in FIG. 2 are described below.

A terminal device is a mobile device that supports satellite communication, and may access a satellite network through an air interface and initiate services such as a call and Internet access. The terminal device may be any one of the foregoing possible terminals.

A network device mainly provides a wireless access service, schedules a radio resource for an access terminal, and provides a reliable wireless transmission protocol, a reliable data encryption protocol, and the like. The network device may be any one of the foregoing possible network devices.

A core network provides services such as user access control, mobility management, session management, user security authentication, and charging. The core network includes a plurality of functional units, which may be classified into control plane functional entities and data plane functional entities. An access and mobility management function (AMF) is responsible for user access management, security authentication, and mobility management. A user plane unit (UPF) is responsible for managing functions such as user plane data transmission, traffic statistics collection, and security intercept. A session management unit (SMF) is mainly responsible for interacting with a data plane, and creating, updating, and deleting a session.

A terrestrial station is responsible for forwarding signaling and service data between a satellite base station and a core network.

As shown in FIG. 2, the satellite and the terrestrial station are the network devices, and are configured to provide a communication service for the terminal. The terrestrial station may also be referred to as a gateway (gateway), a gateway station, or the like. A link between the satellite and the terminal is referred to as a service link (service link), and a link between the satellite and the gateway is a feeder link (feeder link).

When the satellite works in a transparent (transparent) mode, the satellite has a relay and forwarding function. The terrestrial station has functions of a base station or some functions of a base station. Optionally, the terrestrial station may be considered as a terrestrial base station; or a terrestrial base station and the terrestrial station may be separately deployed.

When the satellite works in a regenerative (regenerative) mode, the satellite has a data processing capability, and functions of a base station or some functions of a base station. The satellite may be considered as a base station.

It should be understood that, in embodiments of this application, for a TA rate (TA rate) used in a process of calculating a repetition segment duration, round-trip TA rates of the service link and the feeder link are comprehensively considered. The method provided in embodiments of this application is applicable to the transparent mode and the regenerative mode of the satellite. This is not limited in embodiments of this application.

Compared with a terrestrial communication network, in an NTN, typical communication devices such as satellites and HPAs are used in a network deployment technology, to implement true global network coverage. Advantages of the NTN and strategic significance of the NTN for development are self-evident. In the NTN, NTN systems may be classified into four types based on satellite running orbital heights, that is, a low earth orbit LEO satellite system with an orbital height of 500 km to 2,000 km, a medium earth orbit (MEO) satellite system with an orbital height of 2,000 km to 20,000 km, a high earth orbit (HEO) satellite system with an elliptical orbital height of over 20,000 km, and a geostationary earth orbit (GEO) satellite system with an orbital height of 35,800 km. A satellite communication system and 5G are integrated to complement each other, to constitute a sea-land-air-space integrated communication network with seamless global coverage. This satisfies users' requirements for ubiquitous services, and is an important development direction of communication in the future.

In the NTN, the LEO satellite system has a low round-trip delay RTD and a low path loss, and may be applied to an internet of things (IOT) system.

Currently, a weak transmit power level of a terminal device in the IoT system and restrictions imposed by hardware factors such as a transmit antenna of the terminal device result in a low signal-to-noise ratio of an IT uplink transmission. Therefore, to improve preamble sequence detection performance and a receive signal-to-noise ratio for sending uplink data and a preamble sequence of a system, a repeated transmission needs to be performed on a physical uplink shared channel (PUSCH) and a narrowband physical random access channel NPRACH. In a terrestrial cellular system, a TA and a TA rate in an IoT communication scenario are much less than those in an NTN scenario. Therefore, a validity period of calculating pre-compensation amounts such as a TA and a Doppler frequency shift before one uplink transmission starts in the terrestrial cellular system is longer than that in the NTN system. In this case, in a terrestrial cellular LTE system, an allowed time-continuous transmission duration of IoT uplink repetition sending is greater. For example, it is specified in the 3GPP standard TS 36.211 that a NPRACH allowed time-continuous transmission duration may be 64 repetition units or 16 repetition units (repetition units). It is also specified in the LTE standard that a NPUSCH allowed time-continuous transmission duration may be 250 ms. After the allowed time-continuous transmission duration ends, a specific time gap may be inserted for uplink synchronization of the terminal device.

However, if an existing standard of the allowed time-continuous transmission duration in LTE is still used in the NTN system, an accumulated TA error is far greater than a timing error (Te) specified in LTE. Consequently, out-of-synchronized communication occurs. In this case, it is considered that more uplink gaps (UL gaps) than those in a terrestrial system are introduced into an NTN-IoT (NTN-IoT) uplink transmission, so that a TA compensation amount and the like used by the terminal can be adjusted and updated in each gap in a timely manner, and then communication synchronization can be maintained in an entire repetition periodicity.

Figure 3:
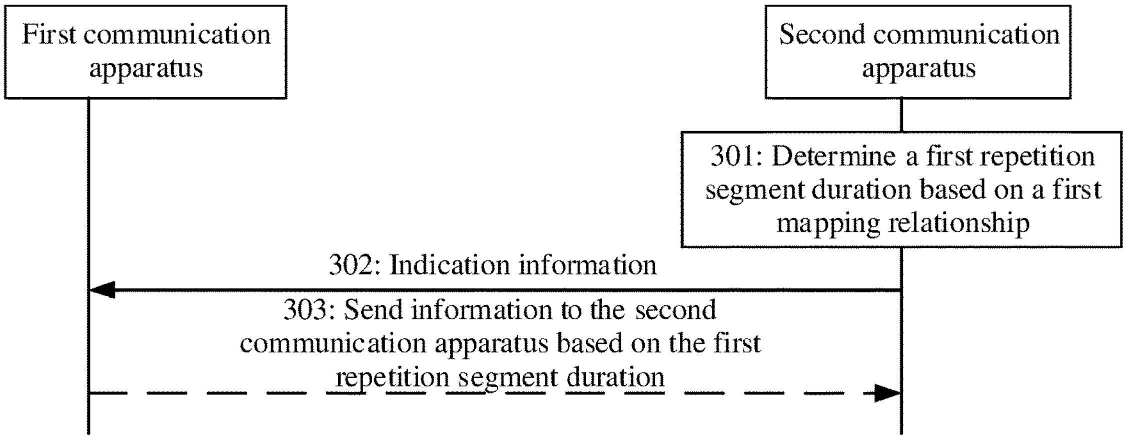
FIG. 3 is a schematic diagram of a communication method according to an embodiment of this application.

To resolve the foregoing problem, this application provides a communication method. As shown in FIG. 3, the method may include the following steps.

Step 301: A second communication apparatus determines a first repetition segment duration based on a first mapping relationship.

This application relates to a first communication apparatus and the second communication apparatus. The first communication apparatus may be the foregoing terminal device, and the second communication apparatus may be the foregoing network device.

The first mapping relationship includes a correspondence between a beam elevation angle and repetition segment durations. The first repetition segment duration may be a repetition segment duration corresponding to a first beam elevation angle, and the first beam elevation angle may be a current beam elevation angle of the first communication apparatus.

The first mapping relationship may be determined from a plurality of mapping relationships, each of the plurality of mapping relationships corresponds to at least one communication parameter, and each mapping relationship may be the correspondence between the beam elevation angle and the repetition segment durations. That is, a factor for determining the repetition segment duration may be a beam elevation angle, or may be a beam elevation angle and a communication parameter.

The communication parameter may be a message format and/or a numerology. For example, the message format may be a format of a preamble sequence, for example, three formats of an IoT preamble sequence specified in TS 36.211, such as a preamble format 0 (preamble format 0), a preamble format 1 (preamble format 1), and a preamble format 2 (preamble format 2). A NPRACH preamble sequence mainly includes a cyclic prefix (CP) part and a sequence part. In this case, a minimum unit of a NPRACH preamble transmission repetition is P symbol groups (symbol groups), where the symbol groups include different CP part lengths and sequence part lengths based on different preamble formats. Table 1 shows structures corresponding to different formats of the NPRACH preamble sequence in the 3GPP standard TS 36.211.

TABLE 1

Structure of a NPRACH preamble sequence

| Preamble format | P | $T_{cp}$ | $T_{SEQ}$ |
|---|---|---|---|
| 0 | 4 | 2048 $T_s$ | 5 × 8192 $T_s$ |
| 1 | 4 | 8192 $T_s$ | 5 × 8192 $T_s$ |
| 2 | 6 | 24576 $T_s$ | 3 × 24576 $T_s$ |

In Table 1, $T_{cp}$ is a CP part length, and $T_{SEQ}$ is a sequence part length. In this case, a duration of a repetition unit equals a product of a number of symbol groups included in the repetition unit and ($T_{cp}$+$T_{SEQ}$). According to Table 1, a repetition unit of a preamble sequence corresponding to the preamble format 0 is P=4 symbol groups, and a duration of the repetition unit of the preamble sequence is 5.6 ms; a repetition unit of a preamble sequence corresponding to the preamble format 1 is P=4 symbol groups, and a duration of the repetition unit of the preamble sequence is 6.4 ms; and a repetition unit of a preamble sequence corresponding to the preamble format 2 is P=6 symbol groups, and a duration of the repetition unit of the preamble sequence is 19.2 ms.

The numerology (numerology) may include parameters such as a subcarrier spacing (subcarrier spacing, SCS), a PUSCH format, a number of tones (Tones), and a number of slots (slots) included in a resource unit (RU). For example, as shown in Table 2, there may be seven different cases (Case 1 to Case 7) of numerologies in TS 36.211.

TABLE 2

Numerology corresponding to an IoT frame structure type 1

| Numerology | PUSCH format | SCS | Tone ($N_{sc}^{RU}$) | Slot ($N_{slot}^{UL}$) |
|---|---|---|---|---|
| Case 1 | 1 | 3.75 kHz | 1 | 16 |
| Case 2 | 1 | 15 kHz | 1 | 16 |
| Case 3 | 1 | 15 kHz | 3 | 8 |
| Case 4 | 1 | 15 kHz | 6 | 4 |
| Case 5 | 1 | 15 kHz | 12 | 1 |
| Case 6 | 2 | 3.75 kHz | 1 | 4 |
| Case 7 | 2 | 15 kHz | 1 | 4 |

It can be learned that the seven different cases correspond to seven different numerologies. A repetition unit length $T_{rep\_unit}$ corresponding to each numerology may be determined based on a number of repetitions of identical slots for NPUSCH $$M_{identical}^{NPUSCH}$$

(number of repetitions of identical slots for NPUSCH) in first $$N_{slot}^{UL}$$

slots in each RU in time domain, a number of slots $$N_{slot}^{UL},$$

and a slot length $T_{slot}$. For example, $$T_{rep\_unit} = M_{identical}^{NPUSCH} \times N_{slot}^{UL} \times T_{slot}.$$

It can be learned from a definition in TS 36.211 that, in four cases other than Case 3 to Case 5, a value of $$M_{identical}^{NPUSCH}$$

is 1.

In Case 3 to Case 5, when the number of repetitions of a NPUSCH transmission $$M_{rep}^{NPUSCH}$$

is less than 8, a value of $$M_{identical}^{NPUSCH}$$

is not fixed. For example, a transport block of a PUSCH includes one resource unit (resource unit). After calculation and analysis (Table 3) are performed, when the number of repetitions of the NPUSCH transmission is less than 8, a TA error (error) caused by a NPUSCH transmission in each of Case 3 to Case 5 is less than a Te, namely, 2.6 μs. That is, segmentation is not required. A value of Te is specified in a protocol. When the transport block of the PUSCH includes another number of resource units (resource units), segmentation may be required.

TABLE 3

| Overall TA error corresponding to a case in which $M_{rep}^{NPUSCH}$ is less than 8 | | | |
|---|---|---|---|
| TA error | $M_{rep}^{NPUSCH} = 2$ | $M_{rep}^{NPUSCH} = 4$ | $M_{rep}^{NPUSCH} = 6$ |
| Case 3 | 0.73 μs | 1.45 μs | 2.1 μs |
| Case 4 | 0.36 μs | 0.73 μs | 1.09 μs |
| Case 5 | 0.18 μs | 0.36 μs | 0.54 μs |

Table 3 shows results obtained through calculation by using an example in which the transport block of the PUSCH includes one resource unit (resource unit). It may be understood that the transport block of the PUSCH may alternatively include a plurality of resource units.

It can be learned from a definition in TS 36.211 that when the number of repetitions of a NPUSCH transmission $$M_{rep}^{NPUSCH}$$

is greater than or equal to 8, the value of $$M_{identical}^{NPUSCH}$$

is 4, and the repetition unit length $T_{rep\_unit}$ may be determined based on $$M_{identical}^{NPUSCH}.$$

In this case, a corresponding repetition segment duration may be determined based on a value range of $$M_{rep}^{NPUSCH}.$$

It may be understood that, in embodiments of this application, the solutions are described by using the TS 36.211 standard as an example. The solutions in embodiments of this application are also applicable to another standard or another case, and shall fall within the protection scope of this application.

The first mapping relationship may be a mapping relationship corresponding to a first parameter, and the first parameter may be a communication parameter currently used by the first communication apparatus. It may be understood that the communication parameter may be scheduled when the second communication apparatus configures a resource for a current information transmission. For example, the second communication apparatus may indicate the communication parameter to the first communication apparatus by using downlink control information (downlink control information, DCI). That is, the second communication apparatus knows the communication parameter. Alternatively, the first communication apparatus may send indication information to the second communication apparatus before performing an information transmission. The indication information indicates a communication parameter used for the current information transmission. That is, the first communication apparatus may notify the second communication apparatus of the communication parameter. This is not limited in embodiments of this application.

In a possible implementation, in the first mapping relationship, absolute values of differences between any two adjacent beam elevation angles in beam elevation angles are the same, or absolute values of differences between any two adjacent repetition segment durations in repetition segment durations are the same. To be specific, repetition segment durations corresponding to different beam elevation angles of the first communication apparatus may be determined through equal beam-elevation-angle division; or beam elevation angles corresponding to different transmission durations may be determined within an allowed time-continuous transmission duration through equal repetition-segment-duration division.

In a possible implementation, in the first mapping relationship, each of the repetition segment durations includes at least one repetition unit, and absolute values of differences between numbers of any two adjacent repetition units in a number of the at least one repetition unit are the same.

Similarly, numbers of repetition units included in repetition segment durations corresponding to different beam elevation angles of the first communication apparatus may be determined through equal division of numbers of repetition units. This solution is applicable to a NPRACH transmission.

The foregoing "adjacent" may mean two adjacent beam elevation angles or two repetition segment durations arranged in ascending or descending order. For example, the beam elevation angles are arranged in ascending order, and may be 10°, 20°, 30°, 40°, and the like. Herein, 10° and 20° or 20° and 30° may be considered as adjacent beam elevation angles.

Optionally, before determining the first repetition segment duration based on the first mapping relationship, the second communication apparatus may obtain first information. The first information may include location information, and the location information may be used to determine the current beam elevation angle of the first communication apparatus. That the second communication apparatus obtains the first information may be that the second communication apparatus obtains location information periodically reported by the terminal, for example, global navigation satellite system (GNSS) location information; or that the second communication apparatus may obtain location information that is currently stored on a network side and that is reported by the terminal at a previous moment, for example, GNSS location information. This is not limited in embodiments of this application.

Step 302: The second communication apparatus sends indication information to the first communication apparatus, and correspondingly, the first communication apparatus receives the indication information.

The indication information may indicate the first repetition segment duration.

It should be understood that the indication information may be an index determined based on the first mapping relationship, for example, a bit field. After receiving the index, the first communication apparatus searches for a corresponding repetition segment duration based on the first mapping relationship. Optionally, the first communication apparatus may store the first mapping relationship in advance. In consideration of a case in which a format or a numerology of an information transmission may change, the first communication apparatus may also store, in advance, the plurality of mapping relationships including the first mapping relationship. Correspondingly, the second communication apparatus also needs to store at least the first mapping relationship. Optionally, the first mapping relationship and/or the plurality of mapping relationships including the first mapping relationship may alternatively be sent by the second communication apparatus to the first communication apparatus. This is not limited in embodiments of this application.

It may be understood that the indication information may alternatively be a specific value of the first repetition segment duration. In this case, the first communication apparatus does not need to store the mapping relationship.

In addition, the second communication apparatus may send indication information to the first communication apparatus before each information transmission, where the indication information indicates a repetition segment duration of each information transmission. Alternatively, after a previous repetition segment duration ends, the second communication apparatus may determine a beam elevation angle of the first communication apparatus based on a real-time location of the first communication apparatus, and determine whether the repetition segment duration needs to be updated. If the location of the first communication apparatus does not change, or a location change of the first communication apparatus is insufficient to cause a change of the repetition segment duration, the second communication apparatus does not need to send the indication information before a next repetition segment duration starts (that is, before a next information transmission); or if the location of the first communication apparatus changes and is sufficient to cause a change of the repetition segment duration, the second communication apparatus determines a real-time beam elevation angle based on information about a changed location of the first communication apparatus, determines a new repetition segment duration based on the beam elevation angle, and sends, to the first communication apparatus, indication information indicating the new repetition segment duration. The first communication apparatus may send information based on the new repetition segment duration in a next information transmission.

It should be understood that the foregoing repetition segment duration is less than or equal to a maximum allowed time-continuous transmission duration corresponding to the repetition segment duration. The maximum allowed time-continuous transmission duration may be determined based on a timing error Te and a TA rate.

For example, the maximum allowed time-continuous transmission duration (the maximum allowed time-continuous transmission duration) $T_{seg\_max}$, the timing error Te, and the TA rate $TA_{rate}$ may meet the following relationship:

$$T_{seg\_max} = \frac{Te}{TA_{rate}}.$$

The $TA_{rate}$ may be determined based on an orbital height H of the second communication apparatus (for example, a satellite) and a beam elevation angle θ of the terminal pointing to the second communication apparatus.

In this embodiment of this application, an example in which $$M_{rep}^{NPUSCH}$$

is greater than 8 is used to calculate the repetition segment duration. It may be understood that $$M_{rep}^{NPUSCH}$$

may alternatively be less than or equal to 8, and a method for calculating the repetition segment duration is similar. Details are not described herein again.

In a possible implementation, the indication information may further indicate a number of repetition units (time-continuous repetition number). This is not limited in embodiments of this application. A repetition unit may be a unit that includes a specific number of slots in the NPUSCH (NPUSCH repetition unit), or may be a unit that includes a specific number of symbol groups in the NPRACH (NPRACH repetition unit).

In a possible implementation, the indication information may be carried in a system information block (system information block, SIB) message for sending.

Optionally, the method may further include the following step.

Step 303: The first communication apparatus sends a first message to the second communication apparatus based on the first repetition segment duration, and correspondingly, the second communication apparatus receives the first message based on the first repetition segment duration.

For example, it is assumed that the first repetition segment duration is 24 ms. In this case, the first communication apparatus repeatedly sends the first message to the second communication apparatus, and each sending duration is 24 ms. After 24 ms ends, the first communication apparatus may adjust a TA compensation amount and the like before a next repeated transmission.

According to the foregoing method, the repetition segment duration of the current information transmission is determined based on the beam elevation angle of the first communication apparatus. When a location of the second communication apparatus changes at a high speed, an appropriate repetition segment duration is provided for the first communication apparatus, so that an accumulated TA error of the first communication apparatus and the second communication apparatus is not excessively large. This facilitates communication synchronization between the first communication apparatus and the second communication apparatus, and improves communication efficiency.

Figure 4:
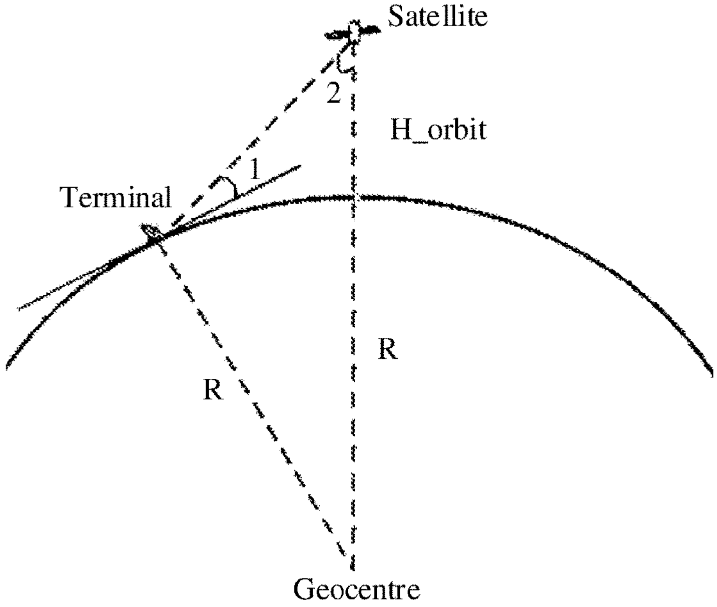
FIG. 4 is a schematic diagram of a location relationship between a terminal device and a satellite according to an embodiment of this application.

It should be further understood that, according to the foregoing method, the repetition segment duration of the current information transmission is determined based on the beam elevation angle of the first communication apparatus. The beam elevation angle of the first communication apparatus may alternatively be replaced with another angle. For example, as shown in FIG. 4, the angle may be a beam angle of the second communication apparatus (for example, a satellite), for example, an angle 2 in FIG. 4. The beam angle and the beam elevation angle of the first communication apparatus may be mutually converted based on a trigonometric function relationship. Similar angles shall fall within the protection scope of this application.

An example in which the second communication apparatus indicates the repetition segment duration to the first communication apparatus is used in FIG. 3. It may be understood that the first communication apparatus may alternatively determine the repetition segment duration based on the mapping relationship. Correspondingly, the first communication apparatus sends, to the second communication apparatus, indication information indicating the repetition segment duration of the current information transmission. In this case, the first communication apparatus needs to store the mapping relationship in advance. For a method performed by the first communication apparatus in the method, refer to the method performed by the second communication apparatus in FIG. 3. Details are not described again.

For example, the first communication apparatus receives ephemeris information delivered by the second communication apparatus, and calculates the beam elevation angle of the first communication apparatus by using a satellite location and speed in an ephemeris. The repetition segment duration is determined based on the beam elevation angle and the foregoing mapping relationship, and the repetition segment duration may be carried in uplink data to notify the second communication apparatus. This solution is applicable to a transmission of uplink data (for example, a NPUSCH).

In a possible implementation, the second communication apparatus may indicate a second mapping relationship to the first communication apparatus. The second mapping relationship may be determined by the second communication apparatus based on the beam elevation angle of the first communication apparatus. The second mapping relationship may include a correspondence between a message format and a repetition segment duration.

For example, first communication apparatuses in a cell (beam) may use different numerologies. When delivering an SIB broadcast, the second communication apparatus may put a group of signaling in a broadcast message, and send the broadcast message to all first communication apparatuses. The first communication apparatuses in the beam use a same beam elevation angle. The second communication apparatus may determine a correspondence between a numerology and a repetition segment duration based on the current beam elevation angle. For example, if the current beam elevation angle is 63.8 degrees, the second communication apparatus carries, in the SIB message, seven repetition segment durations respectively corresponding to seven numerologies corresponding to the 63.8 degrees, and sends the SIB message in a broadcast manner. After decoding an SIB, the first communication apparatus obtains a group of repetition segment durations, and may select, based on a numerology currently used by the first communication apparatus, one of seven values included in the SIB message to be used.

It may be understood that a number of first communication apparatuses and a number of second communication apparatuses are not limited in embodiments of this application. When a communication system includes a plurality of first communication apparatuses, the indication information may be sent in a plurality of times, or may be sent at a time in a broadcast or multicast manner. This is not limited in embodiments of this application.

Figure 5:
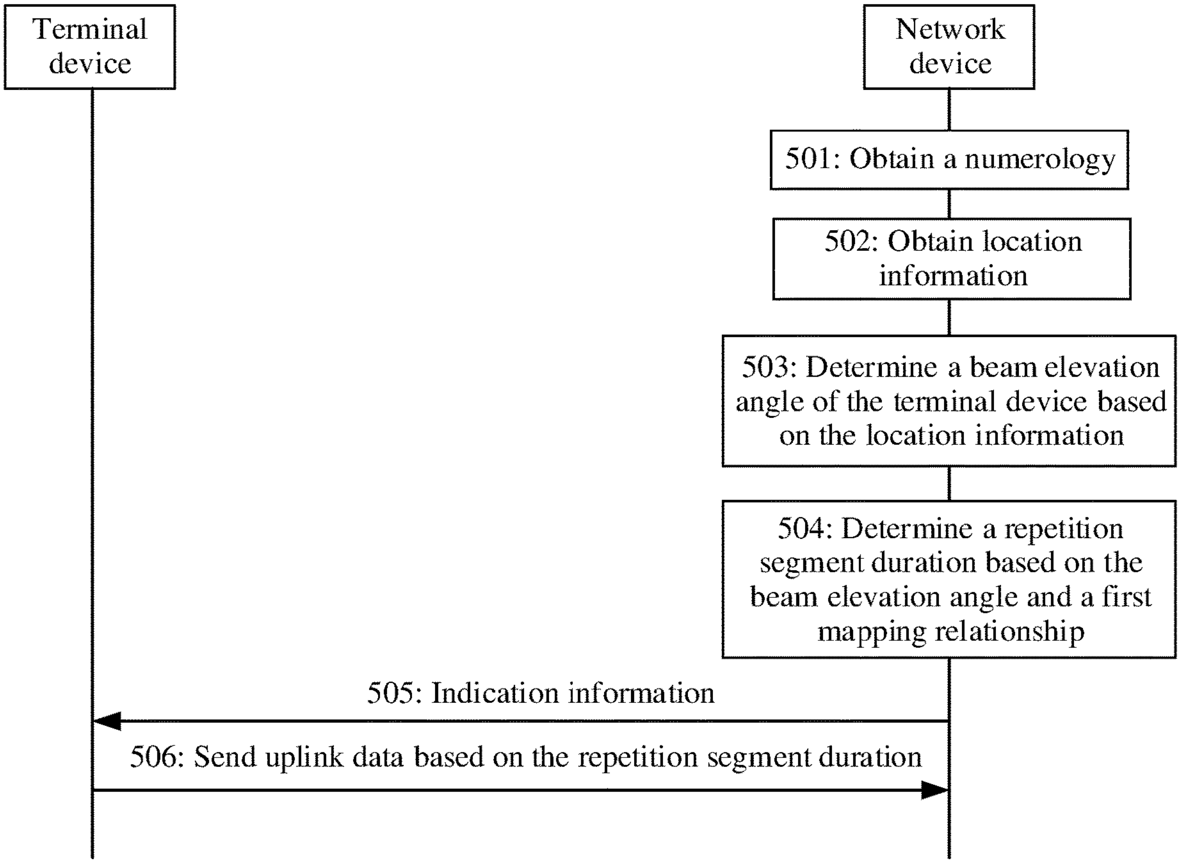
FIG. 5 is a schematic flowchart of a communication method according to an embodiment of this application.

This application provides an embodiment. In this embodiment, in a scenario in which a terminal device sends uplink data, descriptions are provided by using an example in which a second communication apparatus determines, through equal beam-elevation-angle division of a first communication apparatus, a repetition segment duration corresponding to each beam elevation angle and by assuming that a satellite orbital height is 600 km, namely, LEO-600. The first communication apparatus is the terminal device, and the second communication apparatus is a network device. As shown in FIG. 5, this embodiment may include the following steps.

Step 501: The network device obtains a numerology.

The numerology may be an example of the communication parameters in step 301 in FIG. 3. For details, refer to the descriptions in step 301 in FIG. 3.

Step 502: The network device obtains location information of the terminal device.

For the location information and a method of obtaining the location information, refer to the descriptions in step 301 in FIG. 3.

Step 503: The network device determines a beam elevation angle of the terminal device based on the location information.

Step 504: The network device determines a repetition segment duration based on the beam elevation angle and a first mapping relationship.

For this step, refer to the descriptions in step 301 in FIG. 3.

It should be understood that step 503 and step 504 may be performed separately, or may be performed synchronously. This is not limited in embodiments of this application.

Step 505: The network device sends indication information to the terminal device, and correspondingly, the terminal device receives the indication information.

The indication information indicates the repetition segment duration. For this step, refer to the descriptions in step 302 in FIG. 3.

Step 506: The terminal device sends the uplink data based on the repetition segment duration.

Optionally, the uplink data is a NPUSCH.

The NPRACH is an example of the first message in step 303 in FIG. 3.

In this embodiment, when $$M_{rep}^{NPUSCH}$$

is greater than or equal to 8, the plurality of mapping relationships in FIG. 3 may be those shown in Table 4A.

TABLE 4A

LEO-600 NPUSCH repetition segment duration table

| | | Beam elevation angle | | | | | | | | |
|---|---|---|---|---|---|---|---|---|---|---|
| | | 10° | 20° | 30° | 40° | 50° | 60° | 70° | 80° | 90° |
| $T_{seg\_max}$ (ms) | | 28.70 | 30.08 | 32.63 | 36.89 | 43.97 | 56.52 | 82.63 | 162.8 | 256 |
| Case 1 | N | 0 | 0 | 1 | 1 | 1 | 1 | 2 | 5 | 8 |
| | X (ms) | — | — | 32 | 32 | 32 | 32 | 64 | 160 | 256 |
| Case 2 | N | 3 | 3 | 4 | 4 | 5 | 7 | 10 | 20 | 32 |
| | X (ms) | 24 | 24 | 32 | 32 | 40 | 56 | 80 | 160 | 256 |
| Case 3 | N | 1 | 1 | 2 | 2 | 2 | 3 | 5 | 10 | 16 |
| | X (ms) | 16 | 16 | 32 | 32 | 32 | 48 | 80 | 160 | 256 |
| Case 4 | N | 3 | 3 | 4 | 4 | 5 | 7 | 10 | 20 | 32 |
| | X (ms) | 24 | 24 | 32 | 32 | 40 | 56 | 80 | 160 | 256 |
| Case 5 | N | 7 | 7 | 8 | 9 | 10 | 14 | 20 | 40 | 64 |
| | X (ms) | 28 | 28 | 32 | 36 | 40 | 56 | 80 | 160 | 256 |
| Case 6 | N | 3 | 3 | 4 | 4 | 5 | 7 | 10 | 20 | 32 |
| | X (ms) | 24 | 24 | 32 | 32 | 40 | 56 | 80 | 160 | 256 |
| Case 7 | N | 14 | 15 | 16 | 18 | 21 | 28 | 41 | 81 | 128 |
| | X (ms) | 28 | 30 | 32 | 36 | 42 | 56 | 82 | 162 | 256 |

It should be understood that Table 4A is merely used as an example instead of a limitation, and all or some content of Table 4A may be used for implementation. This is not limited in embodiments of this application.

Table 4A shows calculation results of maximum segment transmission durations, repetition segment durations, and numbers of repetition units that correspond to beam elevation angles. When a beam elevation angle is 40°, a corresponding maximum segment transmission duration is 36.89 ms, a corresponding repetition segment duration is 32 ms, and a corresponding number of repetition units is 1. When the beam elevation angle falls within an interval of two adjacent angles shown in the foregoing table, a maximum segment duration, a repetition segment duration, a number of repetition units, and the like that correspond to a minimum angle within the interval may be used. When the beam elevation angle is 46° and falls within an interval of 40° to 50°, a corresponding maximum segment transmission duration may be 36.89 ms corresponding to 40°. Other angles are similar, and details are not described again. It should be noted that, when the beam elevation angle is greater than or equal to 83.67°, because a maximum segment duration corresponding to the angle is greater than a maximum allowed time-continuous transmission duration specified in the standard, a maximum segment transmission duration, a repetition segment duration, a number of repetition units, and the like that correspond to 90° may be used. When the beam elevation angle is less than 83.67° within an interval of 80° to 90°, a maximum segment transmission duration, a repetition segment duration, a number of repetition units, and the like that correspond to 80° may be used.

In Table 4A, N is a maximum number of NPUSCH repetition units that may be included in each repetition segment, X is a repetition segment duration determined based on a calculated maximum allowed time-continuous transmission duration $T_{seg\_max}$, and Case 1 to Case 7 indicate seven different numerologies.

The first mapping relationship in step 504 may be a correspondence between a specific case, X, and N in Table 4A. For example, the first mapping relationship may be that shown in Table 5.

TABLE 5

First mapping relationship

| | | Beam elevation angle | | | | | | | | |
|---|---|---|---|---|---|---|---|---|---|---|
| | | 10° | 20° | 30° | 40° | 50° | 60° | 70° | 80° | 90° |
| $T_{seg\_max}$ (ms) | | 28.70 | 30.08 | 32.63 | 36.89 | 43.97 | 56.52 | 82.63 | 162.8 | 256 |
| Case 1 | N | 0 | 0 | 1 | 1 | 1 | 1 | 2 | 5 | 8 |
| | X (ms) | — | — | 32 | 32 | 32 | 32 | 64 | 160 | 256 |

In this embodiment, nine equal parts with a difference of 10° are obtained through equal beam-elevation-angle division. It should be understood that the equal division difference is merely used as an example. For example, the equal division difference may alternatively be 5°, 15°, or the like. This is not limited in embodiments of this application.

It may be understood that the first mapping relationship in step 504 may be a correspondence between a specific case and X in Table 4A or a correspondence between a specific case and N in Table 4A. This is not limited in embodiments of this application.

When $$M_{rep}^{NPUSCH}$$

is less than 8, the plurality of mapping relationships in FIG. 3 may rep be those shown in Table 4B.

TABLE 4B

LEO-600 NPUSCH repetition segment duration table

| | | | Beam elevation angle | | | | | | | | |
|---|---|---|---|---|---|---|---|---|---|---|---|
| | | | 10° | 20° | 30° | 40° | 50° | 60° | 70° | 80° | 90° |
| | $T_{seg\_max}$ (ms) | | 28.7 | 30.08 | 32.63 | 36.89 | 439.7 | 56.52 | 82.63 | 162.8 | 256 |
| Case 1 | X (ms) | $M_{rep} = 4$ | — | — | — | — | — | — | — | — | — |
| | | $M_{rep} = 1, 2$ | — | — | — | — | — | — | — | — | — |
| Case 2 | X (ms) | $M_{rep} = 4$ | — | — | — | — | — | — | — | — | — |
| | | $M_{rep} = 1, 2$ | — | — | — | — | — | — | — | — | — |
| Case 3 | X (ms) | $M_{rep} = 4$ | 24 | 24 | 32 | 32 | 40 | 56 | 80 | 160 | 256 |
| | | $M_{rep} = 1, 2$ | 28 | 28 | 32 | 36 | 40 | 56 | 80 | 160 | 256 |
| Case 4 | X (ms) | $M_{rep} = 4$ | 28 | 28 | 32 | 36 | 40 | 56 | 80 | 160 | 256 |
| | | $M_{rep} = 1, 2$ | 28 | 30 | 32 | 36 | 42 | 56 | 82 | 162 | 256 |
| Case 5 | X (ms) | $M_{rep} = 4$ | 28 | 30 | 32 | 36 | 42 | 56 | 82 | 162 | 256 |
| | | $M_{rep} = 1, 2$ | 28 | 30 | 32 | 36 | 43 | 56 | 82 | 162 | 256 |
| Case 6 | X (ms) | $M_{rep} = 4$ | — | — | — | — | — | — | — | — | — |
| | | $M_{rep} = 1, 2$ | — | — | — | — | — | — | — | — | — |
| Case 7 | X (ms) | $M_{rep} = 4$ | — | — | — | — | — | — | — | — | — |
| | | $M_{rep} = 1, 2$ | — | — | — | — | — | — | — | — | — |

It should be further understood that N in Table 4A may be determined based on $T_{seg\_max}$ and a repetition unit duration $T_{rep\_unit}$. For example, the foregoing three parameters may meet the following relationship:

$$N = \frac{T_{seg\_max}}{T_{rep\_unit}}.$$

It can be learned from Table 4A that a NPUSCH repetition segment duration X in the LEO-600 scenario has 16 different duration values, and a value set of the NPUSCH repetition segment duration is X={16 ms, 24 ms, 28 ms, 30 ms, 32 ms, 36 ms, 40 ms, 42 ms, 48 ms, 56 ms, 64 ms, 80 ms, 82 ms, 160 ms, 162 ms, 256 ms}. The indication information in step 505 may be one of 4-bit signaling. For example, when the beam elevation angle of the terminal device is 20°, and a currently used numerology is Case 3, the network device may determine that a repetition segment duration corresponding to a current transmission is 16 ms, and send indication information to the terminal device. The indication information may be 0001. Then, the terminal device receives the indication information, determines that the repetition segment duration corresponding to the indication information is 16 ms, and sends information to the network device based on the repetition segment duration of 16 ms.

It should be understood that the foregoing bit value is merely used as an example instead of a limitation.

It should be further understood that in Case 1 in Table 4A, when the beam elevation angles are respectively 10° and 20°, corresponding numbers of repetition units are respectively 0. This is because a repetition unit duration corresponding to Case 1 specified in the standard is greater than a maximum allowed time-continuous transmission duration of 28.70 ms. In this case, the network device does not need to indicate the repetition segment duration of the current information transmission.

It should be understood that Table 4B is merely used as an example instead of a limitation, and all or some content of Table 4B may be used for implementation. Table 4B may alternatively be represented in combination with Table 4A. This is not limited in embodiments of this application.

It may be understood that Table 4B shows mapping relationships between related parameters and repetition segment durations calculated when $$M_{rep}^{NPUSCH}$$

is less than 8, and $M_{rep}$ in Table 4B is the same as $$M_{rep}^{NPUSCH}$$

described above. It can be learned from Table 4B that an rep NPUSCH repetition segment duration X in the LEO-600 scenario has 16 different duration values, and a value set of the NPRACH repetition segment duration is X={16 ms, 24 ms, 28 ms, 30 ms, 32 ms, 36 ms, 40 ms, 43 ms, 48 ms, 56 ms, 64 ms, 80 ms, 82 ms, 160 ms, 162 ms, 256 ms}. Table 4A does not include 43 ms. In a possible manner, to unify indications of repetition segment durations in different value ranges of $$M_{rep}^{NPUSCH},$$

43 ms in Table 4B may be adjusted to 42 ms. To be specific, a same set of repetition segment durations may be used for an indication, that is, X={16 ms, 24 ms, 28 ms, 30 ms, 32 ms, 36 ms, 40 ms, 42 ms, 48 ms, 56 ms, 64 ms, 80 ms, 82 ms, 160 ms, 162 ms, 256 ms}. In Table 4B, when a beam elevation angle is greater than 83.67°, a correspondence between the beam elevation angle and a repetition segment duration is similar to that in Table 4A. Details are not described again.

In this embodiment, based on division of elevation angles from the terminal to the satellite in an LEO system, a network side indicates, to the terminal device by using only 4-bit signaling, segment durations that are used for different elevation angles in different numerology cases of the NPUSCH and that does not exceed a limit of Te, to provide appropriate repetition segment durations for the terminal device, so that an accumulated TA error of the terminal device and the network device is not excessively large. This facilitates communication synchronization between the terminal device and the network device, and improves communication efficiency. In addition, the elevation angles are in an equally-divided range from 10 degrees to 90 degrees, which can cover most cases of the beam elevation angles in the LEO satellite system.

This application provides another embodiment. For example, a repetition segment duration corresponding to each beam elevation angle is determined through equal division of a maximum allowed time-continuous transmission duration (256 ms) specified in the standard. In this embodiment, when $$M_{rep}^{NPUSCH}$$

is greater than or equal to 8, the mapping relationship in FIG. 3 may be that shown in Table 6.

TABLE 6

| LEO-600 NPUSCH repetition segment duration table | | | | | | | | |
|---|---|---|---|---|---|---|---|---|
| | Beam elevation angle (deg) | | | | | | | |
| | 27.98 | 63.80 | 72.88 | 77.25 | 79.83 | 81.54 | 82.76 | 83.67 |
| Repetition segment duration X (ms) | 32 | 64 | 96 | 128 | 160 | 192 | 224 | 256 |

It should be understood that Table 6 is merely used as an example instead of a limitation, and all or some content of Table 6 may be used for implementation. This is not limited in embodiments of this application.

In this embodiment, the indication information is indicated by 3 bits. In this case, eight different segment duration values need to be configured for each numerology case. However, it is specified in the 3GPP standard that a 40 ms gap used for downlink synchronization needs to be inserted after a maximum duration of 256 ms of an uplink data channel transmission. Therefore, in this embodiment, a same set of preset segment duration values is set for the seven numerologies in Table 1, and a value set of the preset segment duration values is X={32 ms, 64 ms, 96 ms, 128 ms, 160 ms, 192 ms, 224 ms, 256 ms}.

It may be understood that a design of the 3-bit indication information is merely used as an example instead of a limitation.

It can be learned from Table 6 that the mapping relationship provided in this embodiment has a same applicable angle interval for the seven different numerologies. For example, for any one of the seven numerology cases, when the beam elevation angle of the terminal device is 50°, the network device may indicate 3-bit signaling to the terminal device by using an SIB message, to indicate that a NPUSCH repetition segment duration that may be used by the terminal device for the current information transmission is 32 ms.

Alternatively, to cover all angle ranges, Table 6 may be expanded to Table 7.

TABLE 7

| LEO-600 NPUSCH repetition segment duration table | | | | | | | | |
|---|---|---|---|---|---|---|---|---|
| | Beam elevation angle (deg) | | | | | | | |
| | 10~27.98 | 63.80 | 72.88 | 77.25 | 79.83 | 81.54 | 82.76 | 83.67 |
| Case 1-X (ms) | 0 | 64 | 96 | 128 | 160 | 192 | 224 | 256 |
| Case 2-X (ms) | 24 | 64 | 96 | 128 | 160 | 192 | 224 | 256 |
| Case 3-X (ms) | 16 | 64 | 96 | 128 | 160 | 192 | 224 | 256 |
| Case 4-X (ms) | 24 | 64 | 96 | 128 | 160 | 192 | 224 | 256 |
| Case 5-X (ms) | 28 | 64 | 96 | 128 | 160 | 192 | 224 | 256 |
| Case 6-X (ms) | 24 | 64 | 96 | 128 | 160 | 192 | 224 | 256 |
| Case 7-X (ms) | 28 | 64 | 96 | 128 | 160 | 192 | 224 | 256 |

It should be understood that Table 7 is merely used as an example instead of a limitation, and all or some content of Table 7 may be used for implementation. This is not limited in embodiments of this application.

For all numerologies in Table 7, a corresponding repetition segment duration X has different values only when the elevation angle is less than 27.98°.

It should be noted that, when $$M_{rep}^{NPUSCH}$$

is less than 8, repetition segment durations corresponding to 10° to 27.98° in Case 3 and Case 4 is different from those in Table 7. However, because a difference is small, to unify indications of repetition segment durations in different value ranges of $$M_{rep}^{NPUSCH},$$

same mapping relationships, namely, the mapping relationships shown in Table 7, may be used.

The solution in this embodiment is different from the solution shown in FIG. 5 only in the mapping relationships and value results in Table 4A and Table 7. Other steps are similar to those in FIG. 5, and details are not described herein again.

In this embodiment, a same set of mapping relationships may be used for the seven numerologies. This can reduce signaling overheads. In addition, if Table 7 is used, only segment values at a group of angles need to be additionally configured during configuration. Compared with that in Table 2, signaling overheads in Table 7 are further reduced. Correspondingly, in this embodiment, that the network device obtains the communication parameter used by the terminal device for the current information transmission may be an optional step.

This application provides another embodiment. A satellite orbital height in this embodiment is different from the satellite orbital height in the embodiment shown in FIG. 5, and is specifically 1,200 km. In this embodiment, when $$M_{rep}^{NPUSCH}$$

is greater than or equal to 8, the plurality of mapping relationships in FIG. 3 may be those shown in Table 8A.

TABLE 8A

LEO-1200 NPUSCH repetition segment duration table

| | | Beam elevation angle | | | | | | | | |
|---|---|---|---|---|---|---|---|---|---|---|
| | | 10° | 20° | 30° | 40° | 50° | 60° | 70° | 80° | 90° |
| $T_{seg\_max}$ (ms) | | 32.48 | 34.04 | 36.94 | 41.76 | 49.76 | 63.98 | 93.53 | 184.21 | 256 |
| Case 1 | N | 1 | 1 | 1 | 1 | 1 | 1 | 2 | 5 | 8 |
| | X (ms) | 32 | 32 | 32 | 32 | 32 | 32 | 64 | 160 | 256 |
| Case 2 | N | 4 | 4 | 4 | 5 | 6 | 7 | 11 | 23 | 32 |
| | X (ms) | 32 | 32 | 32 | 40 | 48 | 56 | 88 | 184 | 256 |
| Case 3 | N | 2 | 2 | 2 | 2 | 3 | 3 | 5 | 11 | 16 |
| | X (ms) | 32 | 32 | 32 | 32 | 48 | 48 | 80 | 176 | 256 |
| Case 4 | N | 4 | 4 | 4 | 5 | 6 | 7 | 11 | 23 | 32 |
| | X (ms) | 32 | 32 | 32 | 40 | 48 | 56 | 88 | 184 | 256 |
| Case 5 | N | 8 | 8 | 9 | 10 | 12 | 15 | 23 | 46 | 64 |
| | X (ms) | 32 | 32 | 36 | 40 | 48 | 60 | 92 | 184 | 256 |
| Case 6 | N | 4 | 4 | 4 | 5 | 6 | 7 | 11 | 23 | 32 |
| | X (ms) | 32 | 32 | 32 | 40 | 48 | 56 | 88 | 184 | 256 |
| Case 7 | N | 16 | 17 | 18 | 20 | 24 | 31 | 46 | 92 | 128 |
| | X (ms) | 32 | 34 | 36 | 40 | 48 | 62 | 92 | 184 | 256 |

It should be understood that Table 8A is merely used as an example instead of a limitation, and all or some content of Table 8A may be used for implementation. This is not limited in embodiments of this application.

Table 8A shows calculation results of maximum segment transmission durations, repetition segment durations, and numbers of repetition units that correspond to beam elevation angles. When a beam elevation angle is 40°, a corresponding maximum segment transmission duration is 41.76 ms, a corresponding repetition segment duration is 32 ms, and a corresponding number of repetition units is 1. When the beam elevation angle falls within an interval of two adjacent angles shown in the foregoing table, a maximum segment duration, a repetition segment duration, a number of repetition units, and the like that correspond to a minimum angle within the interval may be used. When the beam elevation angle is 46° and falls within an interval of 40° to 50°, a corresponding maximum segment transmission duration may be 41.76 ms corresponding to 40°. Other angles are similar, and details are not described again. It should be noted that, when the beam elevation angle is greater than or equal to 83.67°, because a maximum segment duration corresponding to the angle is greater than a maximum allowed time-continuous transmission duration specified in the standard, a maximum segment transmission duration, a repetition segment duration, a number of repetition units, and the like that correspond to 90° may be used. When the beam elevation angle is less than 83.67° within an interval of 80° to 90°, a maximum segment transmission duration, a repetition segment duration, a number of repetition units, and the like that correspond to 80° may be used.

It can be learned from Table 8A that a NPUSCH repetition segment duration X in the LEO-1200 scenario has 16 different duration values, and a value set of the NPUSCH repetition segment duration is X={32 ms, 34 ms, 36 ms, 40 ms, 48 ms, 56 ms, 60 ms, 62 ms, 64 ms, 80 ms, 88 ms, 92 ms, 160 ms, 176 ms, 184 ms, 256 ms}.

The solution in this embodiment is different from the solution shown in FIG. 5 only in the satellite orbital heights and value results calculated in Table 8A and Table 4A. Other steps are similar to those in FIG. 5. When the beam elevation angle in Table 8A is greater than 83.67°, a correspondence between the beam elevation angles and a repetition segment duration is similar to that in Table 4A. Details are not described herein again.

When $$M_{rep}^{NPUSCH}$$

is less than 8, the plurality of mapping relationships in FIG. 3 may be those shown in Table 8B.

TABLE 8B

LEO-1200 NPUSCH repetition segment duration table

| | | | Beam elevation angle | | | | | | | | |
|---|---|---|---|---|---|---|---|---|---|---|---|
| | | | 10° | 20° | 30° | 40° | 50° | 60° | 70° | 80° | 90° |
| | $T_{seg\_max}$ (ms) | | 32.48 | 34.04 | 36.94 | 41.76 | 49.76 | 63.98 | 93.53 | 184.21 | 256 |
| Case 1 | X (ms) | $M_{rep}$ = 4 | — | — | — | — | — | — | — | — | — |
| | | $M_{rep}$ = 1, 2 | — | — | — | — | — | — | — | — | — |
| Case 2 | X (ms) | $M_{rep}$ = 4 | — | — | — | — | — | — | — | — | — |
| | | $M_{rep}$ = 1, 2 | — | — | — | — | — | — | — | — | — |
| Case 3 | X (ms) | $M_{rep}$ = 4 | 32 | 32 | 32 | 40 | 48 | 56 | 88 | 184 | 256 |
| | | $M_{rep}$ = 1, 2 | 32 | 32 | 36 | 40 | 48 | 60 | 92 | 184 | 256 |
| Case 4 | X (ms) | $M_{rep}$ = 4 | 32 | 32 | 36 | 40 | 48 | 60 | 92 | 184 | 256 |
| | | $M_{rep}$ = 1, 2 | 32 | 34 | 36 | 40 | 48 | 62 | 92 | 184 | 256 |
| Case 5 | X (ms) | $M_{rep}$ = 4 | 32 | 34 | 36 | 40 | 48 | 62 | 92 | 184 | 256 |
| | | $M_{rep}$ = 1, 2 | 32 | 34 | 36 | 41 | 49 | 63 | 93 | 184 | 256 |
| Case 6 | X (ms) | $M_{rep}$ = 4 | — | — | — | — | — | — | — | — | — |
| | | $M_{rep}$ = 1, 2 | — | — | — | — | — | — | — | — | — |
| Case 7 | X (ms) | $M_{rep}$ = 4 | — | — | — | — | — | — | — | — | — |
| | | $M_{rep}$ = 1, 2 | — | — | — | — | — | — | — | — | — |

It should be understood that Table 8B is merely used as an example instead of a limitation, and all or some content of Table 8B may be used for implementation. Table 8B may alternatively be represented in a form of a combination of Table 8B and Table 8A. This is not limited in embodiments of this application.

It may be understood that Table 8B shows mapping relationships between related parameters and repetition segment durations calculated when $$M_{rep}^{NPUSCH}$$

is less than 8, and $M_{rep}$ in Table 8B is the same as $$M_{rep}^{NPUSCH}$$

described above. It can be learned from Table 8B that an NPUSCH repetition segment duration X in the LEO-1200 scenario has 16 different duration values, and a value set of the NPRACH repetition segment duration is X={32 ms, 34 ms, 36 ms, 40 ms, 41 ms, 48 ms, 49 ms, 56 ms, 60 ms, 62 ms, 63 ms, 88 ms, 92 ms, 93 ms, 184 ms, 256 ms}. Table 8A does not include 43 ms. In a possible manner, to unify indications of repetition segment durations in different value ranges of $$M_{rep}^{NPUSCH},$$

41 ms, 49 ms, and 93 ms in Table 8B may be adjusted to 40 ms, 48 ms, and 92 ms respectively. To be specific, a same set of repetition segment durations may be used for an indication, that is, X={32 ms, 34 ms, 36 ms, 40 ms, 48 ms, 56 ms, 60 ms, 62 ms, 64 ms, 80 ms, 88 ms, 92 ms, 160 ms, 176 ms, 184 ms, 256 ms}. In Table 8B, when the beam elevation angle is greater than 83.67°, a correspondence between the beam elevation angle and a repetition segment duration is similar to that in Table 8A. Details are not described again.

This application provides another embodiment. For example, a repetition segment duration corresponding to each beam elevation angle is determined through equal division of a maximum allowed time-continuous transmission duration. In this embodiment, the plurality of mapping relationships in FIG. 3 that are obtained when $$M_{rep}^{NPUSCH}$$

is less than 8 are the same as those obtained when $$M_{rep}^{NPUSCH}$$

is greater than or equal to 8, and may be those shown in Table 9.

TABLE 9

LEO-1200 NPUSCH repetition segment duration table

| | Beam elevation angle (deg) | | | | | | | |
|---|---|---|---|---|---|---|---|---|
| | 10 | 60.02 | 70.54 | 75.53 | 78.47 | 80.41 | 81.79 | 82.83 |
| Repetition segment duration X (ms) | 32 | 64 | 96 | 128 | 160 | 192 | 224 | 256 |

It should be understood that Table 9 is merely used as an example instead of a limitation, and all or some content of Table 9 may be used for implementation. This is not limited in embodiments of this application.

The solution in this embodiment is different from the embodiment including Table 6 only in the satellite orbital heights and value results in Table 9 and Table 6. Other steps are similar to those in the embodiment including Table 6. Details are not described herein again. Correspondingly, in this embodiment, that the network device obtains the communication parameter used by the terminal device for the current information transmission may be an optional step.

Figure 6:
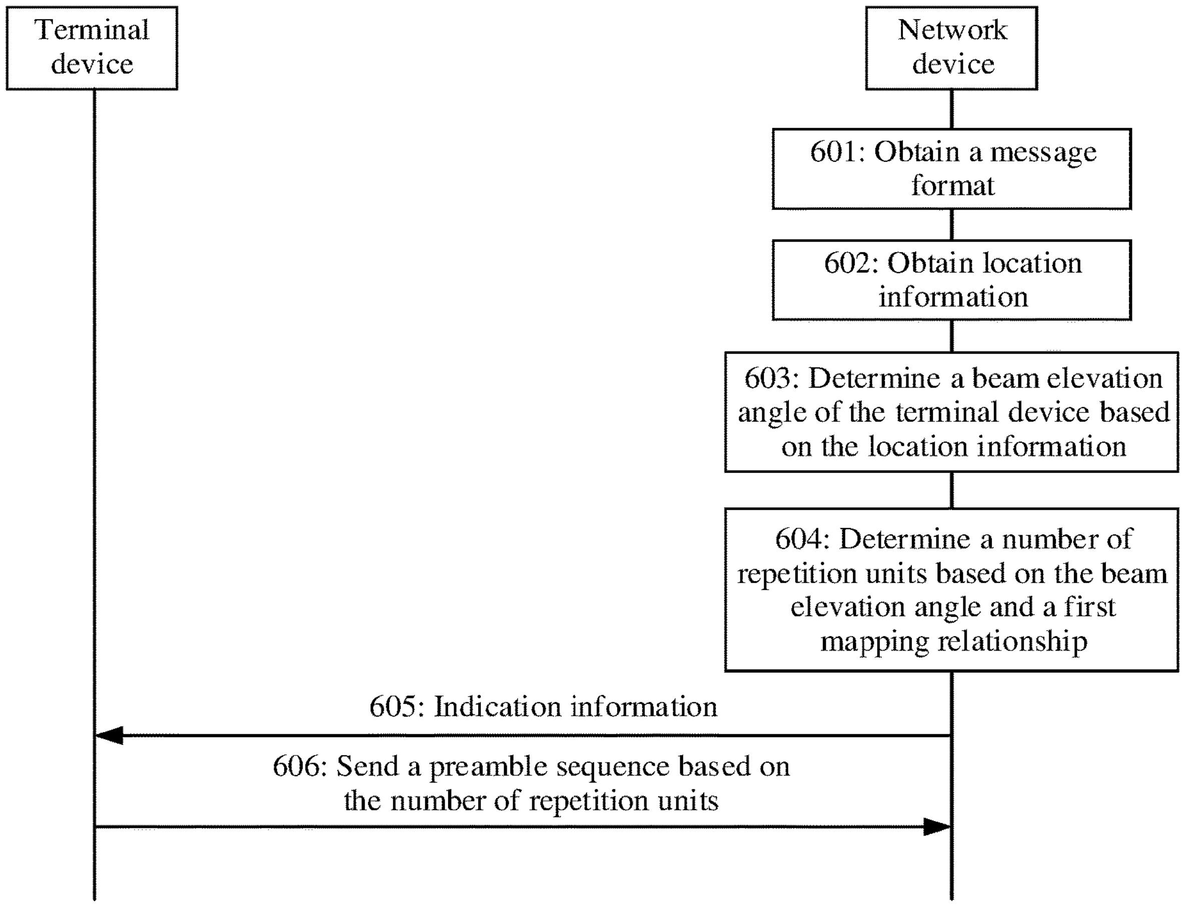
FIG. 6 is a schematic flowchart of another communication method according to an embodiment of this application.

This application provides another embodiment. In this embodiment, in a scenario in which a first communication apparatus sends an uplink message, descriptions are provided by using an example in which a second communication apparatus determines, through equal beam-elevation-angle division of the first communication apparatus, a number of repetition units corresponding to each beam elevation angle and by assuming that a satellite orbital height is 600 km, namely, LEO-600. The first communication apparatus is a terminal device, and the second communication apparatus is a network device. As shown in FIG. 6, this embodiment may include the following steps.

Step 601: The network device obtains a message format.

The message format is an example of the communication parameters in step 301 in FIG. 3. For details, refer to the descriptions in step 301 in FIG. 3.

Step 602: The network device obtains location information.

For the location information and a method of obtaining the location information, refer to the descriptions in step 301 in FIG. 3.

Step 603: The network device determines a beam elevation angle of the terminal device based on the location information.

Step 604: The network device determines a number of repetition units based on the beam elevation angle and a first mapping relationship.

For this step, refer to the descriptions in step 301 in FIG. 3.

It should be understood that step 603 and step 604 may be performed separately, or may be performed synchronously. This is not limited in embodiments of this application.

Step 605: The network device sends indication information to the terminal device.

The indication information indicates the number of repetition units. For this step, refer to the descriptions in step 302 in FIG. 3.

Step 606: The terminal device sends a preamble based on the number of repetition units.

Optionally, the preamble may be carried in a NPRACH. The NPRACH is an example of the first message in step 303 in FIG. 3.

It should be understood that a value range of $$M_{rep}^{NPUSCH}$$

is not distinguished in this embodiment.

In this embodiment, the plurality of mapping relationships in FIG. 3 may be those shown in Table 10.

TABLE 10

Table of a number of repetition units of an LEO-600 NPRACH preamble repetition segment

| Preamble format | Beam elevation angle | | | | | | | | |
|---|---|---|---|---|---|---|---|---|---|
| | 10° | 20° | 30° | 40° | 50° N | 60° | 70° | 80° | 90° |
| Preamble format 0 | 5 | 5 | 5 | 6 | 7 | 10 | 14 | 29 | 64 |
| Preamble format 1 | 4 | 4 | 5 | 5 | 6 | 8 | 12 | 25 | 64 |
| Preamble format 2 | 1 | 1 | 1 | 1 | 2 | 2 | 4 | 8 | 16 |

It should be understood that Table 10 is merely used as an example instead of a limitation, and all or some content of Table 10 may be used for implementation. This is not limited in embodiments of this application.

In Table 10, N is a maximum number of NPRACH repetition units that may be included in each repetition segment, and the preamble formats 0 to 2 indicate three different message formats.

The first mapping relationship in step 604 may be a correspondence between a specific preamble format, a beam elevation angle, and N in Table 10. For example, the first mapping relationship may be that shown in Table 11.

TABLE 11

First mapping relationship

| Preamble format | Beam elevation angle | | | | | | | | |
|---|---|---|---|---|---|---|---|---|---|
| | 10° | 20° | 30° | 40° | 50° N | 60° | 70° | 80° | 90° |
| Preamble format 0 | 5 | 5 | 5 | 6 | 7 | 10 | 14 | 29 | 64 |

In this embodiment, nine equal parts with a difference of 10° are obtained through equal beam-elevation-angle division. It should be understood that the equal division difference is merely used as an example. For example, the equal division difference may alternatively be 5°, 15°, or the like. This is not limited in embodiments of this application.

It should be further understood that N in Table 10 may be determined based on a maximum transmission duration $T_{seg\_max}$ and a repetition unit duration $T_{rep\_unit\_rach}$. For example, the foregoing three parameters may meet the following relationship:

$$N = \frac{T_{seg\_max}}{T_{rep\_unit\_rach}} = \frac{Te/TA_{rate}}{T_{rep\_unit\_rach}}.$$

For example, a preamble sequence specified in TS 36.211 has three formats: a preamble format 0, a preamble format 1, and a preamble format 2, and NPRACH repetition unit durations $T_{rep\_unit\_rach}$ corresponding to the three formats are respectively 5.6 ms, 6.4 ms, and 19.2 ms.

It can be learned from Table 10 that, for all preamble formats, a maximum number N of repetition units that may be included in a repetition segment sent by a NPRACH preamble in the LEO-600 scenario has 14 different values, and a value set of the maximum number of repetition units is N={1, 2, 4, 5, 6, 7, 8, 10, 12, 14, 16, 25, 29, 64}.

The indication information in step 603 may be indicated by 4 bits. For example, when the beam elevation angle of the terminal device is 20°, and a currently used message format is the preamble format 0, the network device may determine that a maximum number of repetition units that may be included in the repetition segment duration corresponding to a current transmission is 5, and send indication information to the terminal device. The indication information may be 0100. Then, the terminal device receives the indication information, determines that the maximum number of repetition units that may be included in the repetition segment duration corresponding to the indication information is 5, and sends a preamble sequence to the network device based on the five repetition units.

It should be understood that the foregoing bit value is merely used as an example instead of a limitation.

In this embodiment, for different preamble formats sent by an uplink preamble, a maximum number of NPRACH repetition units that may be included in repetition segments sent by a NPRACH preamble in a current elevation angle case is designed based on different elevation angle division. In addition, for all preamble sequence formats, a design result shows 14 different segment values. In this way, a network side may indicate, for all different elevation angle cases, an appropriate preamble segment duration (or number) for the terminal by using only 4-bit signaling in the SIB message. In this way, appropriate synchronization time is provided for the terminal device and the network device, so that out-of-synchronized communication is avoided.

This application provides another embodiment. Descriptions are provided by using an example in which a number repetition unit corresponding to each beam elevation angle is determined through equal division of a maximum number of repetition units included in a maximum allowed time-continuous transmission duration specified in the standard. For example, it can be learned from the 3GPP standard TS 36.211 that maximum numbers of NPRACH repetition units that are for an allowed time-continuous transmission and that correspond to the three preamble formats (the preamble formats 0 to 2) are respectively 64, 64, and 16. To unify indication bit numbers for different preamble formats, in this embodiment, a 3-bit indication field is uniformly used to indicate a number of repetition units included in a NPRACH segment duration. That is, eight segment duration values N need to be separately configured for each preamble format:

preamble format 0: A preset value of a number of repetition units is: N={8, 16, 24, 32, 40, 48, 56, 64};

preamble format 1: A preset value of a number of repetition units is: N={8, 16, 24, 32, 40, 48, 56, 64}; and preamble format 2: A preset value of a number of repetition units is: N={2, 4, 6, 8, 10, 12, 14, 16}.

A value of a number of a first repetition unit corresponding to the preamble format 0 is 8, and a corresponding elevation angle is 50.90°. According to the formula, when an elevation angle is less than 50.90°, the number of repetition units has three values: 7, 6, and 5. In this way, to meet a condition that the number of repetition units is applicable to all elevation angles within 10 degrees to 90 degrees, in other words, a value of the number of repetition units should include different cases within 10° to 50.90°, and the number of repetition units should be less than the maximum number of repetition units that may be included in the maximum allowed time-continuous transmission duration specified in the standard and that corresponds to the elevation angles, a first preset segment value is determined as N=5. Alternatively, to ensure that a value of a number of each repetition unit is a multiple of 2, the value of the number of the first repetition unit may be a maximum even number less than 5, namely, N=4. Therefore, a value set of a NPRACH repetition segment duration corresponding to the preamble format 0 may be obtained, that is, N={5 (or 4), 16, 24, 32, 40, 48, 56, 64}. In this way, a value set of a number of NPRACH repetition units in the preamble format 1 and a value set of a number of NPRACH repetition units in the preamble format 2 may be separately determined. That is, the mapping relationships in FIG. 3 may be those shown in Table 12.

TABLE 12

Table of a number of repetition units of an LEO-600 NPRACH preamble repetition segment

| | | | | | | | | | |
|---|---|---|---|---|---|---|---|---|---|
| Preamble format 0 | Elevation angle | 50.90 | 71.62 | 77.87 | 80.93 | 82.76 | 83.97 | 84.83 | 85.48 |
| | N | 5 (4) | 16 | 24 | 32 | 40 | 48 | 56 | 64 |
| Preamble format 1 | Elevation angle | 56.50 | 73.98 | 79.40 | 82.07 | 83.67 | 84.73 | 85.48 | 86.05 |
| | N | 4 | 16 | 24 | 32 | 40 | 48 | 56 | 64 |
| Preamble format 2 | Elevation angle | 42.62 | 68.41 | 75.80 | 79.40 | 81.54 | 82.96 | 83.97 | 84.73 |
| | N | 1 (0) | 4 | 6 | 8 | 10 | 12 | 14 | 16 |

It should be understood that Table 12 is merely used as an example instead of a limitation, and all or some content of Table 12 may be used for implementation. This is not limited in embodiments of this application.

The solution in this embodiment is different from the solution shown in FIG. 6 only in the mapping relationships and value results in Table 10 and Table 11. Other steps are similar to those in FIG. 6, and details are not described herein again.

In this embodiment, a change case of each preamble format in different elevation angle ranges is considered, and especially a segment manner is more reasonable when an elevation angle is large. For example, when the elevation angle is greater than 50 degrees, a change rate of a number of repetition units included in a repetition segment duration of the elevation angle is large. when the number of repetition units is indicated through equal elevation-angle division, an elevation angle corresponding to a great change of the number of repetition units cannot be covered.

This application provides another embodiment. A satellite orbital height in this embodiment is different from the satellite orbital height in the embodiment shown in FIG. 6, and is specifically 1,200 km. In this embodiment, the plurality of mapping relationships in FIG. 3 may be those shown in Table 13.

TABLE 13

Table of a number of repetition units of an LEO-1200 NPRACH preamble repetition segment

| | Beam elevation angle | | | | | | | | |
|---|---|---|---|---|---|---|---|---|---|
| Preamble format | 10° | 20° | 30° | 40° | 50° | 60° | 70° | 80° | 90° |
| | | | | | N | | | | |
| Preamble format 0 | 5 | 6 | 6 | 7 | 8 | 11 | 16 | 32 | 64 |
| Preamble format 1 | 5 | 5 | 5 | 6 | 7 | 9 | 14 | 28 | 64 |
| Preamble format 2 | 1 | 1 | 1 | 2 | 2 | 3 | 4 | 9 | 16 |

It should be understood that Table 13 is merely used as an example instead of a limitation, and all or some content of Table 13 may be used for implementation. This is not limited in embodiments of this application.

It can be learned from Table 13 that, for all preamble formats, a maximum number N of repetition units that may be included in a repetition segment sent by a NPRACH preamble in the LEO-1200 scenario has 15 different values, and a value set of the maximum number of repetition units is N={1, 2, 3, 4, 5, 6, 7, 8, 9, 11, 14, 16, 28, 32, 64}.

The solution in this embodiment is different from the solution shown in FIG. 6 only in the satellite orbital heights and value results calculated in Table 13 and Table 8A. Other steps are similar to those in FIG. 6, and details are not described herein again.

This application provides another embodiment. For example, a number of repetition units corresponding to each beam elevation angle is determined through equal division of a maximum number of repetition units included in a maximum allowed time-continuous transmission duration specified in the standard. In this embodiment, a satellite orbital height is 1,200 km. The mapping relationships in FIG. 3 may be those shown in Table 14.

TABLE 14

| Table of a number of repetition units of an LEO-1200 NPRACH preamble repetition segment | | | | | | | | | |
|---|---|---|---|---|---|---|---|---|---|
| Preamble | Elevation angle | 44.44 | 69.09 | 76.24 | 79.72 | 81.79 | 83.17 | 84.15 | 84.88 |
| format 0 | N | 5 (4) | 16 | 24 | 32 | 40 | 48 | 56 | 64 |
| Preamble | Elevation angle | 51.34 | 71.80 | 77.98 | 81.02 | 82.83 | 84.03 | 84.88 | 85.53 |
| format 1 | N | 5 (4) | 16 | 24 | 32 | 40 | 48 | 56 | 64 |
| Preamble | Elevation angle | 33.6 | 65.39 | 73.88 | 77.98 | 80.41 | 82.02 | 83.17 | 84.03 |
| format 2 | N | 1 (0) | 4 | 6 | 8 | 10 | 12 | 14 | 16 |

It should be understood that Table 14 is merely used as an example instead of a limitation, and all or some content of Table 14 may be used for implementation. This is not limited in embodiments of this application.

According to Table 14, eight types of the number of NPRACH repetition units may be separately configured for each preamble format, and a number of repetition units is indicated by a 3-bit indication field. Specifically, a value of the number N of NPRACH repetition units in each preamble format is shown as follows:

preamble format 0: A preset value of a number of repetition units is: N={5 (or 4), 16, 24, 32, 40, 48, 56, 64};

preamble format 1: A preset value of a number of repetition units is: N={5 (or 4), 16, 24, 32, 40, 48, 56, 64}; and preamble format 2: A preset value of a number of repetition units is: N={1 (or 0), 4, 6, 8, 10, 12, 14, 16}.

The solution in this embodiment is different from the embodiment including Table 12 only in the satellite orbital heights and value results calculated in Table 14 and Table 12. Other steps are similar to those in the embodiment including Table 12. Details are not described herein again.

In this solution, a change case of each preamble format in different elevation angle ranges is considered, and especially reasonableness of a segment manner can be further improved when an elevation angle is large.

A value of X corresponds to a corresponding angle interval on the left. For example, a repetition segment duration corresponding to an interval of 0° to 10° (namely, less than or equal to 10°) is 32 ms, and a repetition segment duration corresponding to an interval of 10° to 60° (namely, greater than 10° and less than or equal to 60°) is 64 ms.

It may be understood that a method for obtaining an integer value is applicable to all tables in embodiments of this application. Details are not listed herein one by one.

In a possible implementation, a second mapping relationship indicated by the second communication apparatus to the first communication apparatus may be that a specific beam elevation angle in each of Table 4A and Table 8A corresponds to X and/or N in Case 1 to Case 7, a specific beam elevation angle or a specific beam elevation angle range in Table 7 corresponds to X in Case 1 to Case 7, or a specific beam elevation angle in Table 10 corresponds to N in the preamble formats 0 to 2. For example, the mapping relationship is that shown in Table 16.

TABLE 16

| Second mapping relationship in an LEO-6005 | | | | | | | |
|---|---|---|---|---|---|---|---|
| Numerology | Case 1 | Case 2 | Case 3 | Case 4 | Case 5 | Case 6 | Case 7 |
| Repetition segment duration X (ms) | — | 24 | 16 | 24 | 28 | 24 | 30 |

In a possible implementation, in the tables in embodiments of this application, a non-integer value is included, or a maximum integer less than a non-integer value may be included. For example, Table 9 is used as an example. A maximum integer less than a non-integer value in Table 9 is selected, and Table 9 may be converted into Table 15.

TABLE 15

| LEO-1200 NPUSCH repetition segment duration table | | | | | | | | |
|---|---|---|---|---|---|---|---|---|
| | Beam elevation angle (deg) | | | | | | | |
| | 10 | 60 | 70 | 75 | 78 | 80 | 81 | 82 |
| Repetition segment duration X (ms) | 32 | 64 | 96 | 128 | 160 | 192 | 224 | 256 |

The second communication apparatus may indicate, to the first communication apparatus, the second mapping relationship shown in Table 16. The mapping relationship is a correspondence between numerologies and repetition segment durations that corresponds to a case in which beam elevation angles of a plurality of first communication apparatus each are 20°. The first communication apparatus may determine a corresponding repetition segment duration based on a numerology used by the first communication apparatus. For example, if the first communication apparatus receives the second mapping relationship shown in Table 16, and the numerology used by the first communication apparatus is Case 3, the first communication apparatus may determine that the corresponding repetition segment duration is 16 ms.

Table 16 is an example of the second mapping relationship in Table 4A. It may be understood that a method for indicating the second mapping relationship is applicable to all embodiments of this application. This is not limited herein.

Embodiments described in this specification may be independent solutions, or may be combined based on internal logic. All these solutions fall within the protection scope of this application.

In the foregoing embodiments provided in this application, the methods provided in embodiments of this application are described from a perspective of interaction between devices. To implement functions in the methods provided in the foregoing embodiments of this application, the network device or the terminal device may include a hardware structure and/or a software module, and implement the foregoing functions in a form of the hardware structure, a software module, or a combination of the hardware structure and the software module. Whether a function in the foregoing functions is performed by using the hardware structure, the software module, or the combination of the hardware structure and the software module depends on particular applications and design constraints of the technical solutions.

Module division in embodiments of this application is an example, and is merely logical function division. There may be another division manner in an actual implementation. In addition, functional modules in embodiments of this application may be integrated into one processor, or may exist alone physically, or two or more modules may be integrated into one module. The integrated module may be implemented in a form of hardware, or may be implemented in a form of a software functional module.

Figure 7:
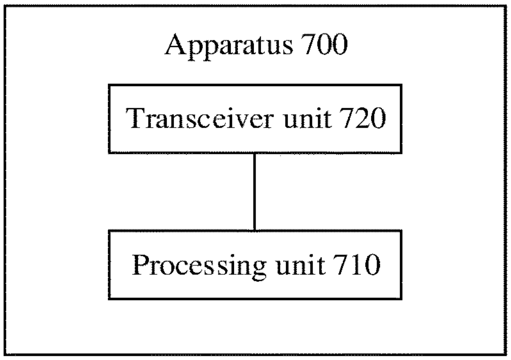
FIG. 7 is a schematic block diagram of a communication apparatus according to an embodiment of this application.
Figure 8:
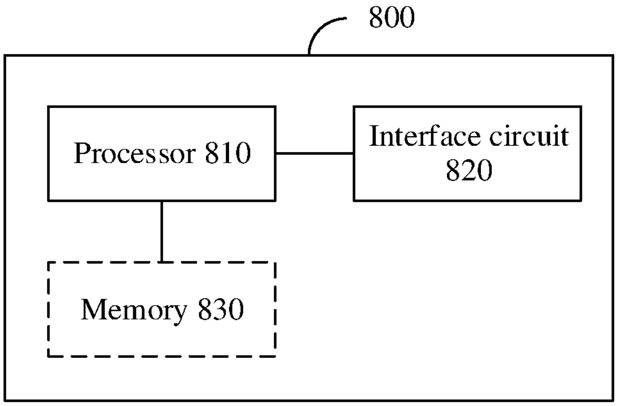
FIG. 8 is a schematic block diagram of another communication apparatus according to an embodiment of this application.

The following describes in detail communication apparatuses provided in embodiments of this application with reference to FIG. 7 and FIG. 8. It should be understood that descriptions of the apparatus embodiments correspond to the descriptions of the method embodiments. Therefore, for content that is not described in detail, refer to the foregoing method embodiments. For brevity, details are not described herein again.

A concept of the communication apparatus is the same as that of the foregoing communication method. As shown in FIG. 7, an embodiment of this application further provides a communication apparatus 700, configured to implement functions of the foregoing method. For example, the apparatus may be a software module or a chip system. In this embodiment of this application, the chip system may include a chip, or may include a chip and another discrete component. The apparatus 700 may include a processing unit 710 and a transceiver unit 720.

In this embodiment of this application, the transceiver unit 720 is configured to perform the steps of sending and receiving information in the foregoing method embodiments.

When the communication apparatus 700 performs a function of a terminal device in the procedure shown in any one of FIG. 3 to FIG. 6 in the foregoing embodiments,

- the transceiver unit 720 is configured to: receive indication information and send information, and
- the processing unit 710 is configured to: determine a repetition segment duration based on the indication information, and the like.

When the communication apparatus 700 performs a function of a network device in the procedure shown in any one of FIG. 3 to FIG. 6 in the foregoing embodiments,

- the transceiver unit 720 is configured to: send indication information and receive information, and
- the processing unit 710 is configured to: determine a repetition segment duration based on a beam elevation angle of a terminal device, and the like.

The foregoing is merely an example. The processing unit 710 and the transceiver unit 720 may further perform other functions. For more detailed descriptions, refer to related descriptions in the method embodiments shown in FIG. 3 to FIG. 6 or other method embodiments. Details are not described herein again.

FIG. 8 shows a communication apparatus 800 according to an embodiment of this application. The apparatus shown in FIG. 8 may be an implementation of a hardware circuit of the apparatus shown in FIG. 7. The communication apparatus is applicable to the foregoing flowcharts, and performs a function of the first communication apparatus (or the network device) or the second communication apparatus (or the terminal device) in the foregoing method embodiments. For ease of description, FIG. 8 shows only main components of the communication apparatus.

As shown in FIG. 8, the communication apparatus 800 includes a processor 810 and an interface circuit 820. The processor 810 and the interface circuit 820 are coupled to each other. It may be understood that the processor 810 may be a logic circuit, and the interface circuit 820 may be a transceiver or an input/output interface. Optionally, the mobile communication apparatus 800 may further include a memory 830, configured to: store instructions executed by the processor 810, or store input data required for running instructions by the processor 810, or store data generated after the processor 810 runs instructions.

When the communication apparatus 800 is configured to implement the methods shown in FIG. 3 to FIG. 6, the processor 810 is configured to implement a function of the processing unit 710, and the interface circuit 820 is configured to implement a function of the transceiver unit 720.

It may be understood that the processor in embodiments of this application may be a central processing unit (CPU), or may be another general-purpose processor, a digital signal processor (DSP), an application-specific integrated circuit (ASIC), a field-programmable gate array (FPGA) or another programmable logic device, a transistor logic device, a hardware component, or any combination thereof. The general-purpose processor may be a microprocessor or any regular processor.

In embodiments of this application, the processor may be a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or a storage medium in any other form well-known in the art. For example, a storage medium is coupled to the processor, so that the processor can read information from the storage medium and write information into the storage medium. Certainly, the storage medium may be a component of the processor. The processor and the storage medium may be disposed in an ASIC. In addition, the ASIC may be located in a network device or a terminal device. Certainly, the processor and the storage medium may alternatively exist as discrete components in the network device or the terminal device.

A person skilled in the art should understand that embodiments of this application may be provided as a method, a system, or a computer program product. Therefore, this application may use a form of a hardware-only embodiment, a software-only embodiment, or an embodiment with a combination of software and hardware. Moreover, this application may use a form of a computer program product that is implemented on one or more computer-usable storage media (including but not limited to a disk memory, an optical memory, and the like) that include computer-usable program code.

An embodiment of this application further provides a computer-readable storage medium. The computer-readable storage medium stores a computer program or instructions, and the computer program or the instructions is/are executed by a computer (for example, a processor), to implement some or all steps of any method performed by any apparatus in embodiments of this application.

An embodiment of this application further provides a computer program product including a computer program or a group of instructions. When the computer program product runs on a computer, some or all steps of any method in the foregoing aspects are performed.

This application further provides a chip or a chip system. The chip may include a processor. The chip may further include a memory (or a storage module) and/or a transceiver (or a communication module), or the chip is coupled to a memory (or a storage module) and/or a transceiver (or a communication module). The transceiver (or the communication module) may be configured to support the chip in performing wired and/or wireless communication. The memory (or the storage module) may be configured to store a program or a group of instructions. The processor may invoke the program or the group of instructions to implement an operation performed by the first communication apparatus (or the terminal device) or the second communication apparatus (or the network device) in any one of the foregoing method embodiments or the possible implementations of the method embodiments. The chip system may include the foregoing chip, or may include the foregoing chips and another discrete component, such as the memory (or the storage module) and/or the transceiver (or the communication module).

Based on a same concept as that of the foregoing method embodiments, this application further provides a communication system. The communication system may include the foregoing first communication apparatus (or the terminal device) and the foregoing second communication apparatus (or the network device). The communication system may be configured to implement an operation performed by the first communication apparatus (or the terminal device) or the second communication apparatus (or the network device) in any one of the foregoing method embodiments or the possible implementations of the method embodiments. For example, the communication system may have the structure shown in FIG. 1.

This application is described with reference to the flowcharts and/or block diagrams of the method, the device (system), and the computer program product according to this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more procedures in the flowcharts and/or in one or more blocks in the block diagrams.

These computer program instructions may be stored in a computer-readable memory that can instruct the computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

It is clearly that, a person skilled in the art can make various modifications and variations to this application without departing from the scope of this application. In this way, this application is intended to cover these modifications and variations of this application provided that they fall within the scope of protection defined by the following claims and their equivalent technologies.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for communication, comprising:

receiving, indication information, wherein the indication information indicates a first repetition segment duration; and sending, a first message based on the first repetition segment duration, wherein the first repetition segment duration indicates a duration of an uplink segment for pre-compensation adjustment, and wherein:

the first message comprises a narrowband physical uplink shared channel (NPUSCH), the first repetition segment duration indicates a repetition segment duration of the NPUSCH, and a value of the first repetition segment duration is one of the following: 32 milliseconds, 64 milliseconds, 128 milliseconds, or 256 milliseconds; or the first message comprises a narrowband physical random access channel (NPRACH), the first repetition segment duration indicates a repetition segment duration of the NPRACH, and a value of the first repetition segment duration is one of the following: 1 repetition unit, 2 repetition units, 4 repetition units, 8 repetition units, 16 repetition units, or 64 repetition units.

2. The method according to claim 1, wherein the first repetition segment duration indicates the repetition segment duration of the NPRACH, and wherein either a preamble format of the NPRACH is a preamble format 2, and the value of the first repetition segment duration is one of the following: 1 repetition unit, 2 repetition units, 4 repetition units, 8 repetition units, or 16 repetition units; or a preamble format of the NPRACH is a preamble format 0 or a preamble format 1, and the value of the first repetition segment duration is one of the following: 8 repetition units, 16 repetition units, or 64 repetition units.

3. The method according to claim 1, wherein the first message comprises the NPRACH and the first repetition segment duration indicates the repetition segment duration of the NPRACH, and wherein a duration of a repetition unit in the repetition segment duration equals a product of a number of symbol groups comprised in the repetition unit and ($T_{cp}+T_{SEQ}$), wherein $T_{cp}$ indicates a cyclic prefix length of an NPRACH preamble, and $T_{SEQ}$ indicates a sequence length of the NPRACH preamble.

4. The method according to claim 2, wherein a number of symbol groups corresponding to the preamble format 0 or the preamble format 1 is four, and a number of symbol groups corresponding to the preamble format 2 is six.

5. The method according to claim 1, wherein the indication information is carried in system information.

6. A method for communication, comprising:

determining a first repetition segment duration, wherein the first repetition segment duration is used to transmit a first message; and sending indication information, wherein the indication information indicates the first repetition segment duration, wherein the first repetition segment duration indicates a duration of an uplink segment for pre-compensation adjustment, and wherein:

the first message comprises a narrowband physical uplink shared channel (NPUSCH), the first repetition segment duration indicates a repetition segment duration of the NPUSCH, and a value of the first repetition segment duration is one of the following: 32 milliseconds, 64 milliseconds, 128 milliseconds, or 256 milliseconds; or the first message comprises a narrowband physical random access channel (NPRACH), the first repetition segment duration indicates a repetition segment duration of the NPRACH, and a value of the first repetition segment duration is one of the following: 1 repetition unit, 2 repetition units, 4 repetition units, 8 repetition units, 16 repetition units, or 64 repetition units.

7. The method according to claim 6, wherein the first repetition segment duration indicates the repetition segment duration of the NPRACH, and wherein either a preamble format of the NPRACH is a preamble format 2, and the value of the first repetition segment duration is one of the following: 1 repetition unit, 2 repetition units, 4 repetition units, 8 repetition units, or 16 repetition units; or a preamble format of the NPRACH is a preamble format 0 or a preamble format 1, and the value of the first repetition segment duration is one of the following: 8 repetition units, 16 repetition units, or 64 repetition units.

8. The method according to claim 6, wherein a duration of each repetition unit equals a product of a number of symbol groups comprised in the repetition unit and $(T_{cp}+T_{SEQ})$, wherein $T_{cp}$ indicates a cyclic prefix length of an NPRACH preamble, and $T_{SEQ}$ indicates a sequence length of the NPRACH preamble.

9. The method according to claim 6, wherein the indication information is carried in system information.

10. A communication apparatus, comprising one or more memories and at least one processor coupled to the one or more memories, wherein the one or more memories store programming instructions for execution by the at least one processor to cause the communication apparatus to perform operations comprising:

receiving, indication information, wherein the indication information indicates a first repetition segment duration; and sending, a first message based on the first repetition segment duration, wherein the first repetition segment duration indicates a duration of an uplink segment for pre-compensation adjustment, and wherein:

the first message comprises a narrowband physical uplink shared channel (NPUSCH), the first repetition segment duration indicates a repetition segment duration of the NPUSCH, and a value of the first repetition segment duration is one of the following: 32 milliseconds, 64 milliseconds, 128 milliseconds, or 256 milliseconds; or the first message comprises a narrowband physical random access channel (NPRACH), the first repetition segment duration indicates a repetition segment duration of the NPRACH, and a value of the first repetition segment duration is one of the following: 1 repetition unit, 2 repetition units, 4 repetition units, 8 repetition units, 16 repetition units, or 64 repetition units.

11. The communication apparatus according to claim 10, wherein the first repetition segment duration indicates the repetition segment duration of the NPRACH, and wherein either a preamble format of the NPRACH is a preamble format 2, and the value of the first repetition segment duration is one of the following: 1 repetition unit, 2 repetition units, 4 repetition units, 8 repetition units, or 16 repetition units; or a preamble format of the NPRACH is a preamble format 0 or a preamble format 1, and the value of the first repetition segment duration is one of the following: 8 repetition units, 16 repetition units, or 64 repetition units.

12. The communication apparatus according to claim 10, wherein the first message comprises the NPRACH and the first repetition segment duration indicates the repetition segment duration of the NPRACH, and wherein a duration of a repetition unit in the repetition segment duration equals a product of a number of symbol groups comprised in the repetition unit and $(T_{cp}+T_{SEQ})$, wherein $T_{cp}$ indicates a cyclic prefix length of an NPRACH preamble, and $T_{SEQ}$ indicates a sequence length of the NPRACH preamble.

13. The communication apparatus according to claim 11, wherein a number of symbol groups corresponding to the preamble format 0 or the preamble format 1 is four, and a number of symbol groups corresponding to the preamble format 2 is six.

14. The communication apparatus according to claim 10, wherein the indication information is carried in system information.

15. The method according to claim 1, wherein the first message comprises the NPUSCH, and a gap for pre-compensation is inserted after the first repetition segment duration.

16. The method according to claim 6, wherein the first message comprises the NPUSCH, and a gap for pre-compensation is inserted after the first repetition segment duration.

17. The communication apparatus according to claim 10, wherein the first message comprises the NPUSCH, and a gap for pre-compensation is inserted after the first repetition segment duration.

18. The method according to claim 1, wherein the pre-compensation adjustment corresponds to a timing advance (TA) and a Doppler frequency shift.

19. The method according to claim 6, wherein the pre-compensation adjustment corresponds to a timing advance (TA) and a Doppler frequency shift.

20. The communication apparatus according to claim 10, wherein the pre-compensation adjustment corresponds to a timing advance (TA) and a Doppler frequency shift.

* * * * *